US006901302B2

(12) United States Patent
Kami

(10) Patent No.: US 6,901,302 B2
(45) Date of Patent: May 31, 2005

(54) HYDROGEN STATION LOADING CONTROL UNIT, VEHICLE ONBOARD TERMINAL UNIT, HYDROGEN STATION, METHOD FOR CONTROLLING HYDROGEN STATION LOADING

(75) Inventor: Yozo Kami, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/214,700

(22) Filed: Aug. 7, 2002

(65) Prior Publication Data

US 2003/0083848 A1 May 1, 2003

(30) Foreign Application Priority Data

Oct. 25, 2001 (JP) ........................................ 2001-327574

(51) Int. Cl.⁷ .............................................. G06F 19/00
(52) U.S. Cl. ................................. 700/90; 700/95; 701/2
(58) Field of Search ......................... 700/90, 95; 701/1, 701/2, 29

(56) References Cited

U.S. PATENT DOCUMENTS

| | | | | |
|---|---|---|---|---|
| 5,442,553 A | * | 8/1995 | Parrillo | ........................ 455/420 |
| 6,078,850 A | * | 6/2000 | Kane et al. | .................... 701/29 |
| 6,339,736 B1 | * | 1/2002 | Moskowitz et al. | .......... 701/29 |
| 6,362,730 B2 | * | 3/2002 | Razavi et al. | ................ 340/438 |
| 6,673,479 B2 | * | 1/2004 | McArthur et al. | ............. 429/12 |

FOREIGN PATENT DOCUMENTS

JP         2002315111 A   * 10/2002

* cited by examiner

*Primary Examiner*—Jayprakash N. Gandhi
(74) *Attorney, Agent, or Firm*—Merchant & Gould P.C.

(57) ABSTRACT

A hydrogen station loading control unit, which is capable of loading hydrogen vehicles with hydrogen, thereby promoting the wide use of hydrogen vehicles which are advantageous for the earth environment. The hydrogen station loading control unit communicates through a communication network with a plurality of hydrogen vehicles that drive with hydrogen in vehicle onboard hydrogen containers loaded at a plurality of hydrogen stations equipped with hydrogen loading units. The hydrogen station loading control unit includes a communication unit for receiving information relating to residual volume in each of the vehicle onboard hydrogen containers as transmitted by each of the hydrogen vehicles through the communication network, a data receiving function, a hydrogen vehicle DB which stores a regular hydrogen station for each of the hydrogen vehicles, a loading plan generating function for generating a loading plan for each of the hydrogen stations based on the residual volume information and a loading time setting & notifying function for transmitting the loading plan for each of the hydrogen stations through the communication network.

32 Claims, 17 Drawing Sheets

FIG.3

RESIDUAL VOLUME DATA FORMAT

| RECIPIENT ADDRESS (CONTROL SERVER ADDRESS) | SENDER ADDRESS (VEHICLE ONBOARD TERMINAL ADDRESS) | RESIDUAL VOLUME |
|---|---|---|

FIG.4

LOADING PLAN(XX HYDROGEN STATION)　　　　　YEAR MONTH DAY HOUR MINUTE

| REGISTERED No | SENDER ADDRESS | RESIDUAL VOLUME(a) | HYDROGEN CONTAINER VOLUME(b) | LOADING JUDGMENT | LOADING VOLUME (c=a-b) |
|---|---|---|---|---|---|
| 01 | xxxx | xxxx | xxxx | X | |
| 02 | xxxx | xxxx | xxxx | X | |
| 03 | xxxx | xxxx | xxxx | X | |
| 04 | xxxx | xxxx | xxxx | O | xxxx |
| TOTAL | - | xxxx | xxxx | - | xxxx(d) |

STOCK VOLUME(e)=xxxx(Nm3)
HYDROGEN EXCESS/SHORTAGE VOLUME(f=e-d)=▲xxxx(Nm3) SHORT SUPPLY.

FIG.5

HYDROGEN VEHICLE DB FORMAT

| REGISTERED No | VEHICLE ONBOARD TERMINAL ADDRESS (SENDER ADDRESS) | OWNER NAME | HYDROGEN CONTAINER VOLUME | RESIDUAL VOLUME | HYDROGEN CONTAINER TYPE |
|---|---|---|---|---|---|

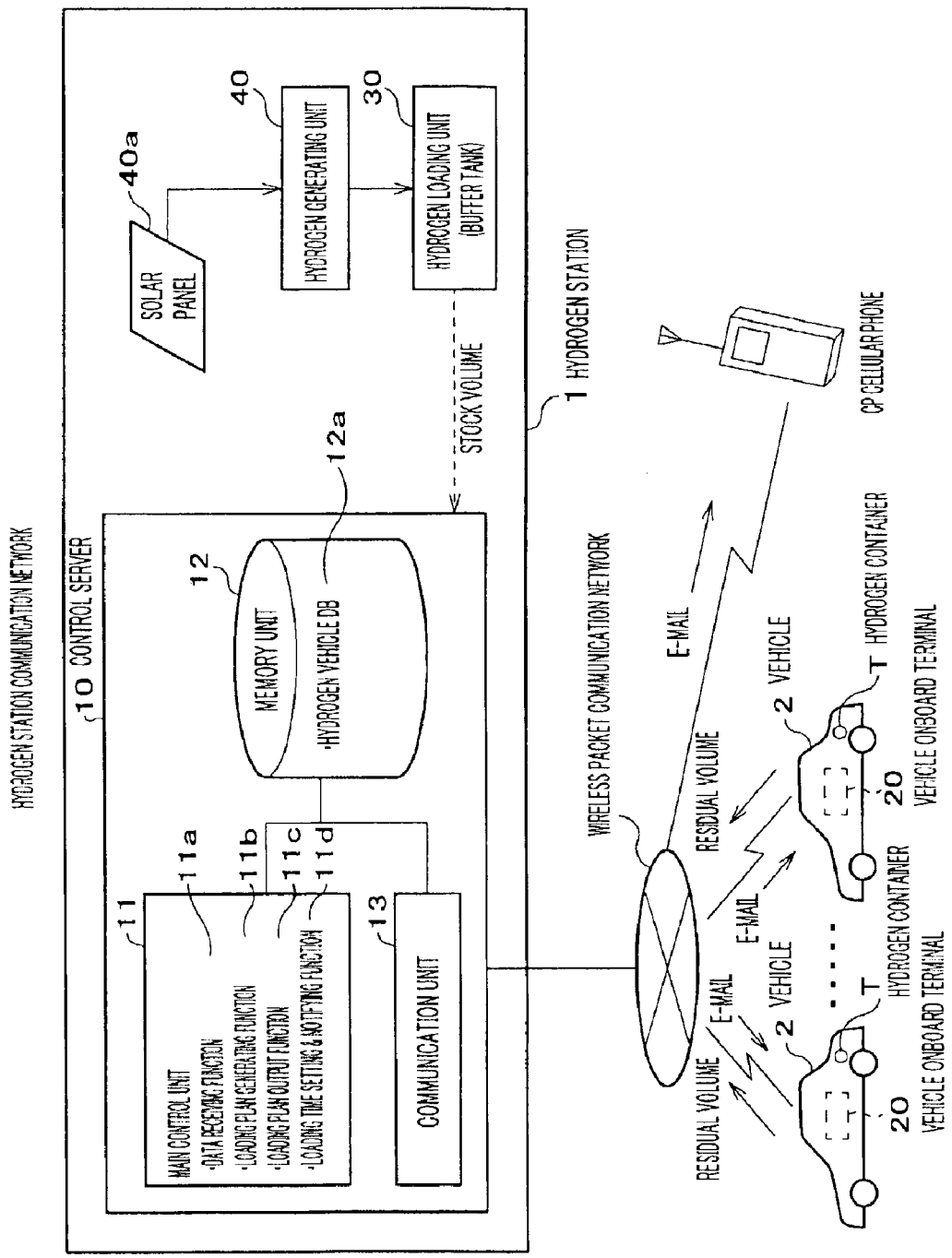

FIG.9

LOADING PLAN (XX HYDROGEN STATION)   YEAR MONTH DAY HOUR MINUTE

| REGISTERED No | SENDER ADDRESS | RESIDUAL VOLUME(a) | HYDROGEN CONTAINER VOLUME(b) | RESIDUAL VOLUME RATIO(%) | LOADING JUDGMENT | LOADING VOLUME (c=a-b) | LOADING TIME |
|---|---|---|---|---|---|---|---|
| 01 | xxxx | xxxx | xxxx | 15 | ○ | xxxx | MONTH DAY |
| 02 | xxxx | xxxx | xxxx | 80 | × | | |
| 03 | xxxx | xxxx | xxxx | 56 | × | | |
| 04 | xxxx | xxxx | xxxx | 28 | ○ | xxxx | MONTH DAY |
| TOTAL | - | xxxx | xxxx | - | - | xxxx(d) | |

STOCK VOLUME(e)=xxxx(Nm3)
HYDROGEN EXCESS/SHORTAGE VOLUME(f=e-d)=▲xxxx(Nm3) SHORT SUPPLY.

THE HYDROGEN VOLUME OF xxx(Nm3/day) IS EXPECTED TO BE PRODUCED
BY THE HYDROGEN GENERATING UNIT.

FIG.10

HYDROGEN VEHICLE DB FORMAT

| REGISTERED No | OWNER NAME | HYDROGEN CONTAINER VOLUME | RESIDUAL VOLUME | HYDROGEN CONTAINER TYPE | CONTACT ADDRESS (E-MAIL ADDRESS) |
|---|---|---|---|---|---|
| | | | | | |

FIG.14

HYDROGEN VEHICLE DB FORMAT

| REGISTERED No | OWNER NAME | HYDROGEN CONTAINER VOLUME | RESIDUAL VOLUME | HYDROGEN CONTAINER TYPE | REGULAR HYDROGEN STATION | CONTACT ADDRESS (E-MAIL ADDRESS) |
|---|---|---|---|---|---|---|
| | | | | | | |

FIG.15

HYDROGEN STATION DB FORMAT

| HYDROGEN STATION No | ADMINISTRATOR NAME | HYDROGEN GENERATING UNIT CAPACITY | STOCK VOLUME | CONTACT ADDRESS (IP ADDRESS) |
|---|---|---|---|---|
| | | | | |

FIG.17

LOADING PLAN (C HYDROGEN STATION)     YEAR MONTH DAY HOUR MINUTE

LOADING PLAN (B HYDROGEN STATION)     YEAR MONTH DAY HOUR MINUTE

LOADING PLAN (A HYDROGEN STATION)     YEAR MONTH DAY HOUR MINUTE

| REGISTERED No | SENDER ADDRESS | RESIDUAL VOLUME(a) | HYDROGEN CONTAINER VOLUME(b) | RESIDUAL VOLUME RATIO(%) | LOADING JUDGMENT | LOADING VOLUME (c=a-b) | LOADING TIME |
|---|---|---|---|---|---|---|---|
| 01 | xxxx | xxxx | xxxx | 15 | ○ | xxxx | MONTH DAY |
| 02 | xxxx | xxxx | xxxx | 80 | × | | |
| 03 | xxxx | xxxx | xxxx | 56 | × | | |
| 04 | xxxx | xxxx | xxxx | 28 | ○ | xxxx | MONTH DAY |
| TOTAL | — | xxxx | — | — | — | xxxx(d) | |

STOCK VOLUME(e)=xxxx(Nm3)

HYDROGEN EXCESS/SHORTAGE VOLUME(f=e-d)=▲xxxx(Nm3) SHORT SUPPLY.

THE HYDROGEN VOLUME OF xxx(Nm3/day) IS EXPECTED TO BE PRODUCED BY THE HYDROGEN GENERATING UNIT.

LOADING PLAN AND LOADING TIME TRANSMITTED TO A HYDROGEN STATION
LOADING PLAN AND LOADING TIME TRANSMITTED TO B HYDROGEN STATION
LOADING PLAN AND LOADING TIME TRANSMITTED TO C HYDROGEN STATION

FIG.19

HYDROGEN STATION DB FORMAT

| HYDROGEN STATION | ADMINISTRATOR NAME | HYDROGEN GENERATING UNIT CAPACITY | STOCK VOLUME | HYDROGEN EXCESS/SHORTAGE VOLUME | HYDROGEN STATION LOCATION | CONTACT ADDRESS (IP ADDRESS) |
|---|---|---|---|---|---|---|
| No | | | | | | |

FIG.21
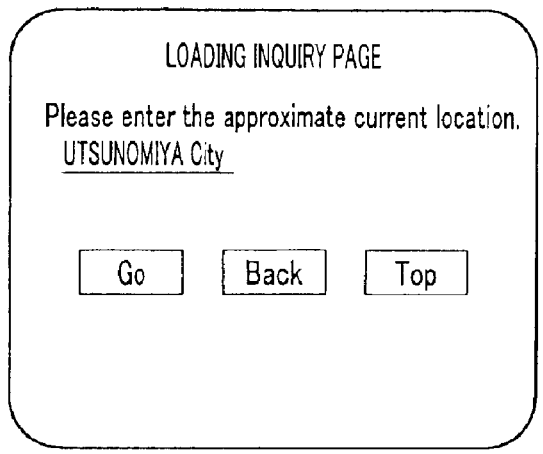
FIG.22
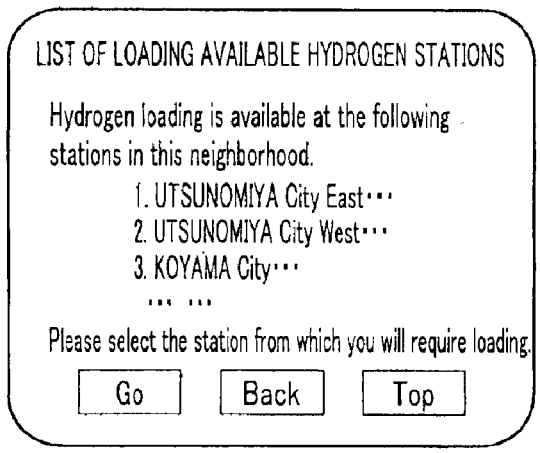
FIG.23
HYDROGEN GENERATING UNIT WORK PATTERN TABLE
| HYDROGEN EXCESS/SHORTAGE VOLUME | HYDROGEN GENERATING UNIT WORK PATTERN |
|---|---|
| LEVEL 0 (NO SHORTAGE) | STOP |
| LEVEL 1 (SLIGHT SHORTAGE) | PHOTOVOLTAIC POWER GENERATION ONLY |
| LEVEL 2 (CONSIDERABLE SHORTAGE) | PHOTOVOLTAIC + NIGHTTIME ELECTRICITY |
| LEVEL 3 (SERIOUS SHORTAGE) | PHOTOVOLTAIC + NIGHTTIME ELECTRICITY + DAYTIME ELECTRICITY |
| ... | ... |

HYDROGEN STATION LOADING CONTROL UNIT, VEHICLE ONBOARD TERMINAL UNIT, HYDROGEN STATION, METHOD FOR CONTROLLING HYDROGEN STATION LOADING

FIELD OF THE INVENTION

The present invention relates to a hydrogen station loading control unit, a vehicle onboard terminal, a hydrogen station, a method for controlling hydrogen station loading and software for a vehicle onboard terminal, which contribute to the promotion of hydrogen vehicles that drive with hydrogen in onboard hydrogen containers and are greatly advantageous for the earth environmental preservation.

BACKGROUND OF THE INVENTION

Hydrogen has been attracting attention environmentally as a clean energy source in view of the prevention of earth warming. In the field of vehicles, hydrogen has been widely noticed as an alternative fuel in place of hydro carbon fuels such as gasoline. Especially a vehicle (fuel cell vehicle), on which a fuel cell that generates electricity electrochemically is mounted, is in the spotlight worldwide and its development is in progress strenuously. Another vehicle powered by an internal combustion engine, which is supplied with hydrogen as fuel, is also coming up for discussion. Each of these hydrogen vehicles has a hydrogen container: either a highly pressurized hydrogen container of some tens MPa or a hydrogen container of metal hydride (MH) type employing hydrogen absorbing alloys. In the case of a hydrogen vehicle (fuel cell case), a fuel cell is supplied with hydrogen by the hydrogen container, thereby generating electricity to drive an electric motor. In the case of the other hydrogen vehicle (internal combustion engine case), the hydrogen stored in the hydrogen container burns in the internal combustion engine to produce driving power.

When the hydrogen container of each hydrogen vehicle is empty, it is necessary to load it with hydrogen. Loading of the hydrogen is performed at a hydrogen station which is equipped with a hydrogen loading unit. It is requested for the hydrogen station that a hydrogen container should be loaded with hydrogen as quickly as possible, so that a driver can handle a hydrogen vehicle like a conventional vehicle. When hydrogen loading is performed, the loading volume of hydrogen is controlled by monitoring the pressure and the temperature changes of the hydrogen container by connecting the communication lines of the hydrogen station with the hydrogen vehicle.

A hydrogen station, which loads a sizable number of hydrogen vehicles, requires a large number of large and highly-pressurized hydrogen containers (curdle etc.). Or it is necessary to install a liquefied hydrogen tank and store the evaporated hydrogen in a high-pressurized hydrogen tank such as a tank for buffering. A high power compressor is also requested. So whichever case it is, a spacious area is indispensable, resulting in an undesirably large scale facility.

It is anticipated that large scale hydrogen stations would not be dominant in view of the profitability in the beginning of hydrogen vehicles going on the market. Small scale hydrogen stations would therefore command a majority of stations in loading the hydrogen vehicles, which possibly causes the inconveniences relating to the shortage of hydrogen. So it is required for small scale hydrogen stations to load the customer vehicles with hydrogen smoothly without shortage.

It is needed urgently that the vehicles (hydrogen vehicles) on which the hydrogen containers for supplying hydrogen are mounted and which have environmental advantages such as the prevention of the earth greenhouse effect should be brought into wide use. Implementation of stable supply and smooth loading of hydrogen is prerequisite for promoting the hydrogen vehicles.

SUMMARY OF THE INVENTION

The object of the present invention is to provide a hydrogen station loading control unit, a vehicle onboard terminal, a hydrogen station, a method for controlling hydrogen station loading and a software for a vehicle onboard terminal, which allow even a small hydrogen station to load a hydrogen vehicle smoothly free of shortage. It follows that they will contribute to the promotion of hybrid vehicles which are more friendly to the earth environment.

To assess the object described above a diligent study has been conducted to reach the completion of the present invention. The points to which attention is directed are summarized as follows:

It is important to load hydrogen according to a plan under the conditions that the number of hydrogen stations and their scale are both small. It is assumed that under such conditions it is possible to estimate the number of hydrogen vehicles coming to a hydrogen station for loading.

A hydrogen loading plan for each of the hydrogen vehicles can be implemented if the hydrogen volume required by each hydrogen vehicle which is expected to visit a hydrogen station is known in advance.

Smooth hydrogen loading of each hydrogen vehicle can be performed with the hydrogen loading plan without a shortage of hydrogen.

a. Hydrogen Station Loading Control Unit

The present invention to assess the above-mentioned objects provides a hydrogen station loading control unit which is capable of communicating through a communication network with a plurality of hydrogen vehicles that drive with hydrogen in vehicle onboard hydrogen containers loaded at a hydrogen station, comprising: a receiver which receives hydrogen volume of each of the hydrogen containers from each of the hydrogen vehicles through the communication network; and a plan generator which generates a hydrogen loading plan of each of the hydrogen vehicles for the hydrogen station based upon hydrogen volume.

The hydrogen station loading control unit receives the hydrogen volume from each hydrogen vehicle and prepares a loading plan for it. The loading plan, which is discussed here, should include at a minimum the information that gives the hydrogen volume required for a hydrogen station. It will be of great help for the hydrogen station. The hydrogen volume transmitted from each hydrogen vehicle according to the embodiment is the residual of a hydrogen container. In this connection, it doesn't matter whether this hydrogen loading control unit handles a hydrogen station or a plurality of hydrogen stations. The hydrogen loading control unit can be separated into a receiving portion and a loading plan generating portion, both of which can employ any means so long as it satisfies the required function.

The present invention to assess above-mentioned objects also provides a hydrogen station loading control unit which is capable of communicating through a communication network with both a plurality of hydrogen vehicles that drive with hydrogen in vehicle onboard hydrogen containers loaded at a plurality of hydrogen stations and the plurality of hydrogen stations equipped with hydrogen loading units, comprising: a receiver which receives hydrogen volume of each of the hydrogen containers from each of the hydrogen vehicles through the communication network; a plan generator which generates a hydrogen loading plan of each of the hydrogen vehicles for each of the hydrogen stations based upon the hydrogen volume; and a transmitter for transmitting the hydrogen loading plan to each of the hydrogen stations.

The hydrogen station loading control unit receives the hydrogen volume from each hydrogen vehicle and implements a hydrogen loading plan for each hydrogen station. The loading plan should include at a minimum the information that gives the hydrogen volume required for the hydrogen station. It is not necessarily required to determine which hydrogen station each hydrogen vehicle regularly uses for hydrogen loading. If the regular hydrogen station of a hydrogen vehicle is determined in advance, the data associated with the hydrogen station can be written (stored) in the database (DB) of the hydrogen vehicle or in the data transmitted by the hydrogen vehicle, which will be discussed later in the description of an embodiment. It will thus allow the easier preparation of the loading plan since the regular hydrogen station of a hydrogen vehicle can be identified. Incidentally, it is possible to estimate which hydrogen vehicle uses which hydrogen station for hydrogen loading as long as the number of the hydrogen stations is small.

As another feature, the hydrogen station loading control unit can transmit the loading time and/or the volume of hydrogen of the hydrogen vehicle to the contact address, which includes an e-mail address, an internet protocol (IP) address and the like. It is acceptable whichever may be selected to use a pull-type or a push-type transmission. The pull-type transmission means that the loading time and the like are transmitted to a hydrogen vehicle on request.

In a further feature, the hydrogen station loading control unit prepares the production plan of a hydrogen generating unit based on the hydrogen loading plan. "The preparation of the production plan" here, for example, refers to setting the level of the hydrogen generating unit work pattern table (see FIG. 23) to be described later.

In other features, the hydrogen station loading control unit prepares the list of hydrogen stations which are located in convenient places based on the positioning data transmitted by the hydrogen vehicle and sends the list back to the vehicle. The location to which the list is sent back can include the sender of the positioning data and for example the contact address registered in a hydrogen vehicle data base (DB). The list of loading available hydrogen stations (see FIG. 22)—in the fourth embodiment and its variations to be described later—refers to "a list of the hydrogen stations". If the list of loading available hydrogen stations is sent back as shown in the fourth embodiment and the like, it will be of great convenience for both the driver and the hydrogen station. Furthermore, it will be more helpful for both if the loading at the listed hydrogen station can be reserved.

b. Hydrogen Station

The present invention also provides a hydrogen station which is controlled by the hydrogen station loading control unit. This hydrogen station is capable of loading a hydrogen vehicle with hydrogen smoothly.

c. Vehicle Onboard Terminal

The present invention further provides a vehicle onboard terminal which is mounted on a hydrogen vehicle driving with hydrogen as a fuel loaded at a hydrogen station, comprising: a detecting means for detecting hydrogen volume of a hydrogen container situated on the hydrogen vehicle; and a transmission means for transmitting the hydrogen volume at a predetermined timing through a wireless communication network.

The vehicle onboard terminal, which is, for example, applied to the hydrogen station loading control unit detects and transmits the hydrogen volume at a predetermined timing.

The vehicle onboard terminal transmits the hydrogen volume at the termination of the vehicle operation by sensing it. The hydrogen volume will be constant after the vehicle operation is finished, so the data obtained at the termination is representative of the latest data, which is valuable for a hydrogen volume control unit.

The invention in addition provides the vehicle onboard terminal which is capable of notifying the driver of the hydrogen loading time and/or the hydrogen volume of the hydrogen vehicle.

d. Method for Controlling Hydrogen Station Loading

The present invention provides a method for controlling hydrogen station loading, comprising the steps of; receiving from a plurality of hydrogen vehicles, which drive with hydrogen in vehicle onboard hydrogen containers loaded at a plurality of hydrogen stations, hydrogen volume of each of the hydrogen containers through a communication network; generating a hydrogen loading plan for each of the hydrogen stations based upon the hydrogen volume; determining a hydrogen loading time and/or hydrogen loading volume for each of the hydrogen vehicles based upon the hydrogen loading plan; transmitting the hydrogen loading time and/or hydrogen loading volume for each of the hydrogen vehicles through the communication network.

Any number of the hydrogen stations is selectable, from one to any larger number. The method allows a hydrogen station to load hydrogen vehicles with hydrogen smoothly. The loading plan, as described before, should include at a minimum the information that gives the hydrogen volume required for a hydrogen station.

e. Software for a Vehicle Onboard Terminal

The present invention provides software for a computer of a vehicle onboard terminal which is mounted on a hydrogen vehicle driving with hydrogen in a hydrogen container loaded at a plurality of hydrogen stations, wherein the software executes the computer to serve as a receiving means for receiving hydrogen volume from a detecting means which detects the hydrogen volume of the hydrogen container of the hydrogen vehicle and a transmission means for transmitting the hydrogen volume at a predetermined timing through a wireless communication network.

The software, which is stored in a storage medium such as a CD-ROM and the like, is on the market or it is on the network. A computer which is installed with the software serves as a vehicle onboard terminal.

BRIEF DESCRIPTION OF THE DRAWINGS

FIG. 3 is a figure showing the format of the residual volume transmitted by the vehicle onboard terminal shown in FIG. 2.

FIG. 4 shows an example of loading plan generated by the control server shown in FIG. 1.

FIG. 5 is a figure showing the format of the hydrogen vehicle DB stored in the control server shown in FIG. 1.

FIG. 8 is an overall structural figure showing the hydrogen station communication network system according to the second embodiment, to which the hydrogen station loading control unit of the present invention is applied.

FIG. 9 shows an example of loading plan and loading time generated by the control server shown in FIG. 8.

FIG. 10 is a figure showing the format of the hydrogen vehicle DB stored in the control server shown in FIG. 8.

FIG. 14 is a figure showing the format of the hydrogen vehicle DB stored in the control server shown in FIG. 13.

FIG. 15 is a figure showing the format of the hydrogen station DB stored in the control server shown in FIG. 13.

FIG. 17 is a figure showing conceptually the transmission of the loading plan and the loading time generated by the control server shown in FIG. 13.

FIG. 19 is a figure showing the format of the hydrogen station DB stored in the control server shown in FIG. 18.

FIG. 21 is a figure showing the loading inquiry page displayed on the vehicle onboard terminal shown in FIG. 18.

FIG. 22 is a figure showing the page of the loading available hydrogen stations displayed on the vehicle onboard terminal shown in FIG. 18.

FIG. 23 is a figure showing the hydrogen generating unit work pattern table, which is one of the variations of the present invention.

DESCRIPTION OF THE PREFERRED EMBODIMENTS

Figure 1:
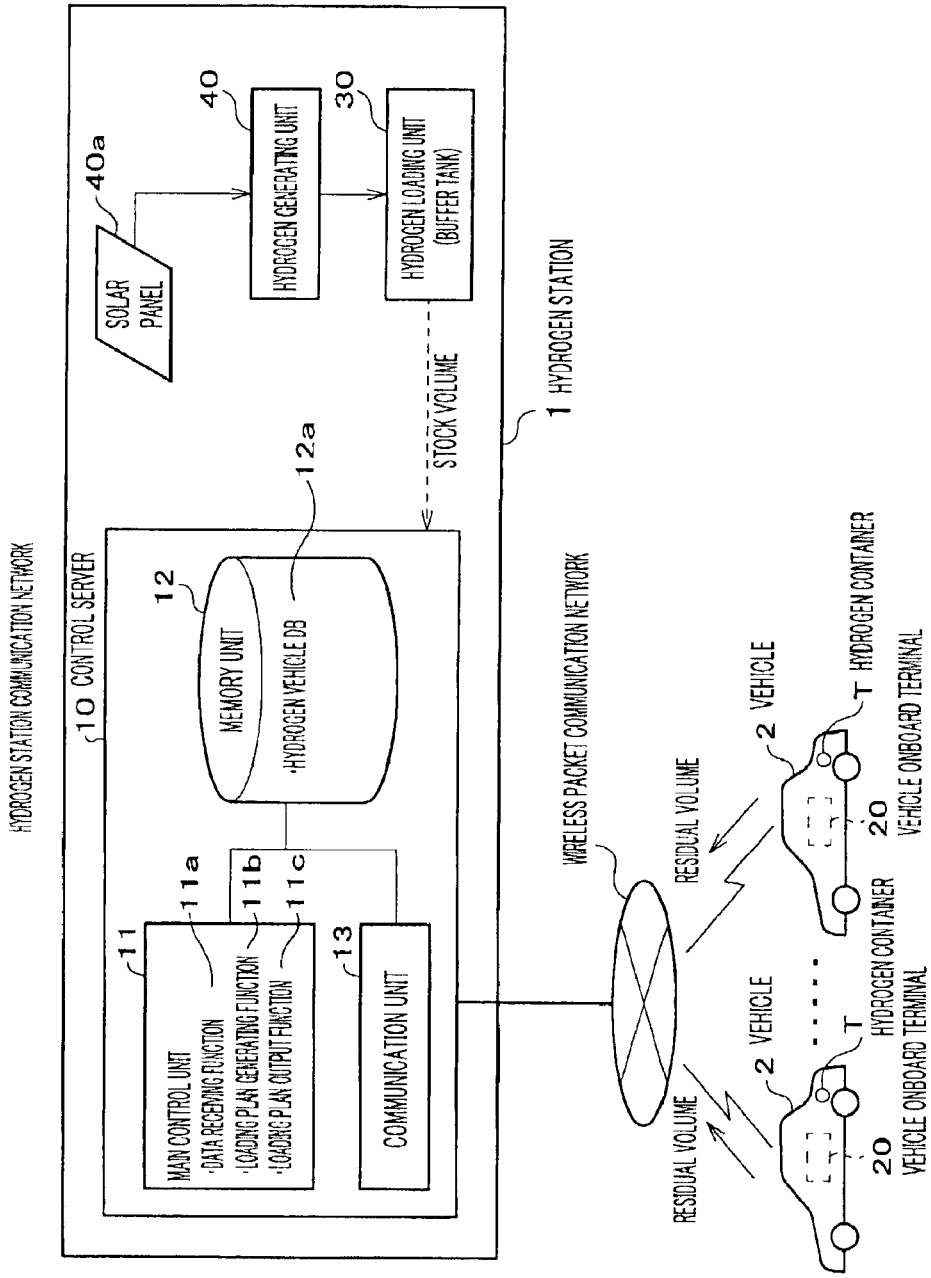
FIG. 1 is an overall structural figure showing the hydrogen station communication network system according to the first embodiment, to which the hydrogen station loading control unit of the present invention is applied.

The embodiments of the present invention will now be described referring to the accompanying drawings.

The descriptions will be categorized into the first through the fourth embodiments. The third and fourth embodiments refer to a plurality of hydrogen stations connected by network.

1. First Embodiment

The first embodiment will be described referring to the drawings.

In the first embodiment, a hydrogen station receives at a predetermined timing the residual hydrogen of the vehicle onboard hydrogen container from each of a plurality of hydrogen vehicles, which are registered with the hydrogen station. A hydrogen loading plan of each hydrogen vehicle is prepared for the hydrogen station based on the received information. FIG. 1 is an overall structural figure illustrating the hydrogen station communication network according to the first embodiment, to which the hydrogen station loading control unit of the present invention is applied.

As shown in FIG. 1, a hydrogen station communication network system includes a control server 10, a plurality of hydrogen vehicles 2 on which a plurality of vehicle onboard terminals 20 are mounted and a hydrogen station 1 in which a hydrogen loading unit 30 is placed. According to this embodiment the number of hydrogen station 1 is one and that of hydrogen vehicles 2 varies from several to somewhere between ten and twenty.

a. Hydrogen Vehicle—Vehicle Onboard Terminal

Figure 2:
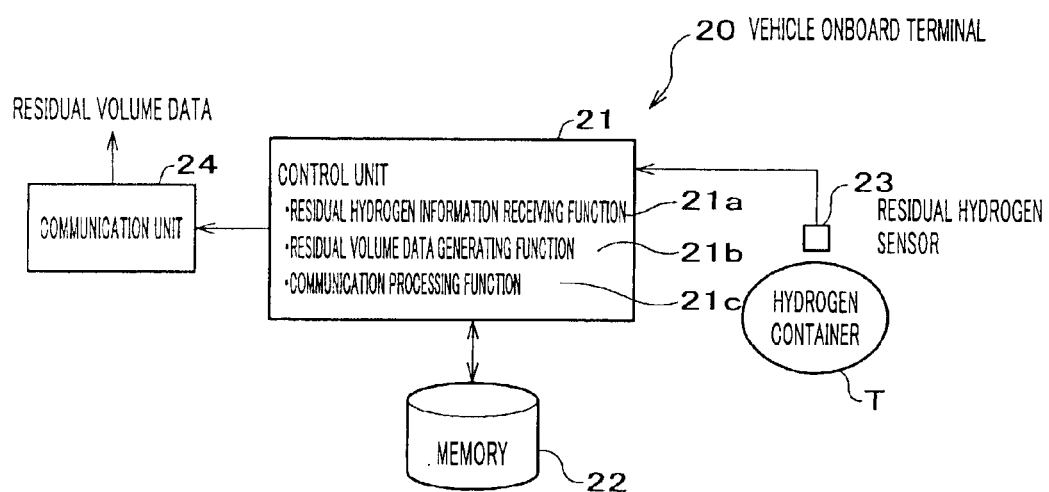
FIG. 2 is a figure showing the structure of the vehicle onboard terminal shown in FIG. 1.

The hydrogen vehicles 2 and the vehicle onboard terminals 20 will first be described. FIG. 2 is a figure showing the structure of each of the vehicle onboard terminals 20. FIG. 3 shows the format of the residual volume data which is transmitted by each of the vehicle onboard terminals 20.

As shown in FIG. 1, the vehicle onboard terminals 20 and a plurality of hydrogen containers T are mounted on the vehicles 2. As shown in FIG. 2, each of the vehicle onboard terminals 20 includes a control unit 21, a memory 22, a residual hydrogen sensor 23 and a communication unit 24.

The hydrogen vehicles 2, on which the hydrogen containers T are mounted, are exemplified by fuel cell vehicles and hydrogen engine vehicles, though they are not limited to these types. A fuel cell vehicle of reformed gasoline and an internal combustion engine vehicle in which both gasoline and hydrogen are combusted, on which hydrogen containers T are mounted, are also categorized as hydrogen vehicles. The reason for it is that they use hydrogen as fuel, which is loaded in the hydrogen containers T, and therefore are able to contribute to the preservation of the earth environment. They also require the loading of hydrogen by the hydrogen station 1.

The control unit 21 of each of the vehicle onboard terminals 20 shown in FIG. 2 comprises a central processing unit (CPU), including a residual hydrogen information receiving function 21a, a residual volume data generating function 21b and a communication processing function 21c. The memory 22 which is composed of RAM's and ROM's stores the programs (the residual hydrogen information receiving function 21a, the residual volume data generating function 21b, the communication processing function 21c, etc.) executed in the control unit 21 and various data.

The residual hydrogen sensor (a detecting means for detecting hydrogen volume) 23 is a pressure sensor, which detects the pressure of each of the hydrogen containers T and transmits it to the control unit 21 as a pressure-referenced residual volume information, when each of the hydrogen containers T is of a high-pressure type. On the other hand, the residual hydrogen sensor 23 may be a flow rate sensor, which detects the flow rate of the consumed hydrogen since an accurate residual hydrogen amount cannot be measured with the restriction of the plateau pressure of hydrogen absorbing alloys, when each of the hydrogen containers T is of a metal hydride (MH) type. The hydrogen containers T of a high-pressure type are relatively light. On the other hand, the hydrogen containers T of a MH type are relatively compact. A hydrogen container of a high-pressure type with volume of 100 liters can contain about 35N cubic meters of hydrogen if it is loaded with pressure of 35 MPa.

The communication unit 24 of each of the vehicle onboard terminals 20 is a transmitter for transmitting the residual volume data with the format shown in FIG. 3 to the control server 10 through the wireless packet communication network, for example PPP (Point to Point Protocol) & TCP/IP (Transport Control Protocol/Internet Protocol), provided by a communication carrier (cellular phone company). Various types of unit are commercially available for the communication unit 24. A method of wireless transmission is selected since the transmission of the residual volume data should be performed while a vehicle is driving. Since a communication fee is paid to the communication carrier depending on the amount of packets transmitted and received, the use of wireless packet communications will save fees when small pieces of information such as residual volume data are transmitted and received frequently. It will also be advantageous for the communication carrier since efficient radio wave use is achieved by the application of a radio wave which carries packets transmitted by multiple users one after another.

The residual hydrogen information receiving function 21a of the control unit 21 receives the residual volume information from the residual hydrogen sensor 23. The residual volume data generating function 21b generates the residual volume data of the format shown in FIG. 3 based on the residual volume information and the recipient address stored in the memory 22. Of the residual volume data the recipient address defines the address of the control server 10 to which the residual volume data is transmitted. The sender address refers to the address of the sender of the residual volume data, which can be used as the ID of each of the hybrid vehicles 2. The residual volume refers to the residual hydrogen volume (N cubic meter) of each of the hydrogen containers T. The residual volume data generating function 21b translates the residual volume into that expressed in the unit of N cubic meter.

The communication processing function 21c transmits the residual volume data which is generated at a predetermined timing to the control server 10 through the communication unit 24. The predetermined timing may include the ON status of the main switch SW of each of the hydrogen vehicles 2, the regular intervals (the regular distances) and the OFF status of the main switch SW. The communication processing function 21c has the following functions: (1) detecting ON-OFF of the main switch SW and recognizing it as the predetermined timing, (2) detecting a regular time interval (e.g. 10 minutes) by a timer and recognizing it as the predetermined timing and (3) transmitting a residual volume data triggered by the main SW OFF signal and turning off the power. "A transmission means for transmitting said hydrogen volume at a predetermined timing through a wireless communication network" refers to the communication processing function 21c (and the communication unit 24). "A judgment making means which is capable of detecting an operation termination of said hydrogen vehicle" refers to the communication processing function 21c.

b. Control Server—Hydrogen Station

The control server 10 and the hydrogen station 1 will be described referring to FIGS. 1, 4 and 5. FIG. 4 shows an example of a loading plan which is generated by the control server 10. FIG. 5 shows a format of the hydrogen vehicle DB which is stored in the memory of the control server 10. "A hydrogen station loading control unit" according to the claims refers to the control server 10.

As shown in FIG. 1, the hydrogen station 1 is equipped with a control server 10, which is the central core of the hydrogen station communication network. The control server 10 includes a main control unit 11, a memory unit 12, a communication unit 13 and IO (input/output) units (not shown) such as a printer, a monitor, a keyboard and a mouse.

The main control unit 11 of the control server 10 is mainly made of a central processing unit (CPU), including a data receiving function 11a, a loading plan generating function 11b and a loading plan output function 11c. The memory unit 12 has a hydrogen vehicle DB 12a and hydrogen loading unit information (not shown). The communication unit 13 is made of a terminal adapter and the like.

The data receiving function 11a of the main control unit 11 receives the residual volume data transmitted by each of the vehicle onboard terminals 20 of each of the hydrogen vehicles 2 through the wireless packet communication network and the communication unit 13. The loading plan generating function 11b generates the loading plan shown in FIG. 4 based on the residual volume stored in the received residual volume data. The loading plan output function 11c processes the loading plan shown in FIG. 4 in order to printout it with the printer (not shown) and display it on the monitor (not shown).

In the loading plan shown in FIG. 4, the residual volume (a) refers to the residual volume (N cubic meter) stored in the residual volume data and the hydrogen container volume (b) refers to the data (N cubic meter) stored in the hydrogen vehicle DB 12a. The loading plan generating function 11b makes a judgment on the loading in such a manner that loading of each of the hydrogen vehicles 2 in the near future is necessary when the residual volume (a) is not more than 30% of the hydrogen container volume (b), identifying with a circle in the loading judgment column shown in FIG. 4. On the other hand, it determines that loading in the near future is not necessary when the ratio exceeds 30%, identifying with a cross in the column.

The stock volume (e) of the loading plan of the hydrogen station 1, which is the hydrogen volume stocked in a buffer of a hydrogen loading unit 30, is entered by hand through the input/output unit of the control server 10 or transmitted (entered) from the hydrogen loading unit 30 real-time through a LAN cable. When the stock volume is entered through the LAN cable, the control server 10, which is equipped with a network interface card (NIC), is connected to the hydrogen loading unit 30 equipped with a LAN-compatible residual hydrogen detector (not shown).

The hydrogen vehicle DB 12a stored in the memory unit 12 is formatted as shown in FIG. 5. The residual volume in the format refers to that stored in the latest residual volume data. The type of hydrogen container indicates the container type such as a high-pressure type, an MH type, or a hybrid of high-pressure and MH type. Types of hydrogen vehicle may be added to the hydrogen vehicle DB 12a such as a pure hydrogen type, a reformer type, a hydrogen engine, etc.

The hydrogen station 1 has a hydrogen generating unit 40 which produces the hydrogen from water by electrolysis. The power for electrolysis is mainly supplied by the photovoltaic power generation. The commercial nighttime electric power is used for the generation of hydrogen in the night, in case the sunlight is not sufficient or in case the shortage of hydrogen is anticipated with the photovoltaic power generation only.

c. Operation

Figure 6A:
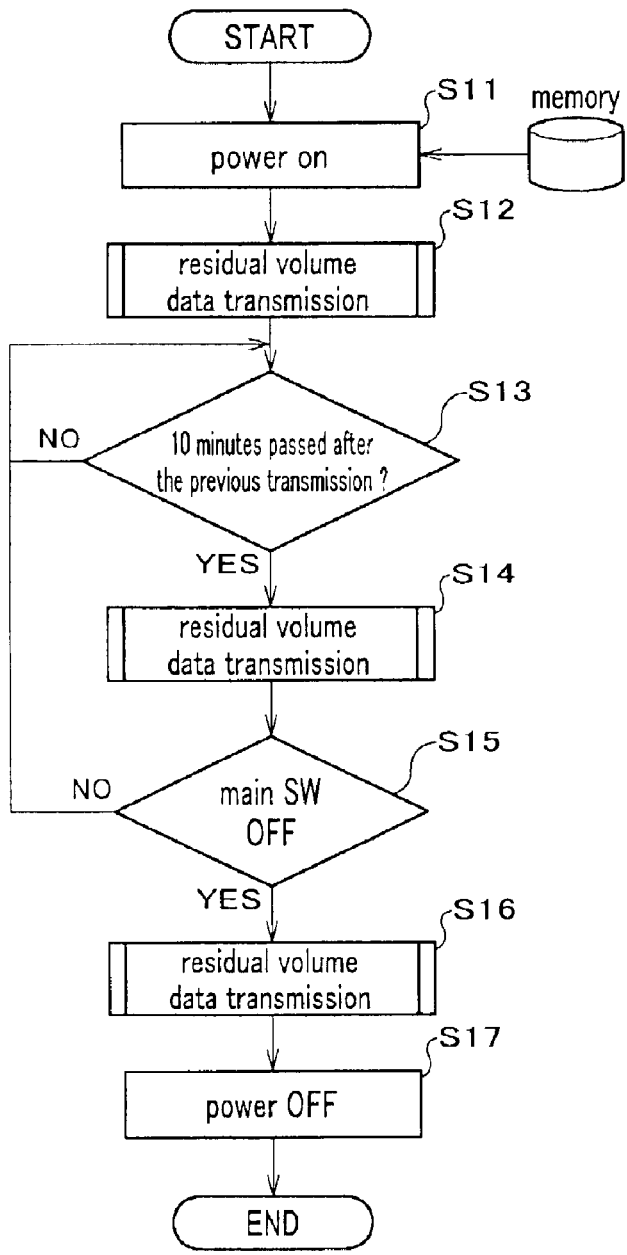
FIGS. 6(a) and 6(b) are flow diagrams describing the operation of the vehicle onboard terminal shown in FIG. 2, (a) main routine and (b) subroutine, respectively.
Figure 6B:
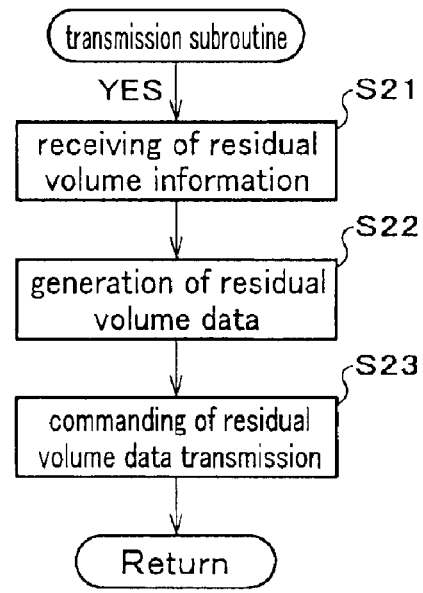
Figure 7:
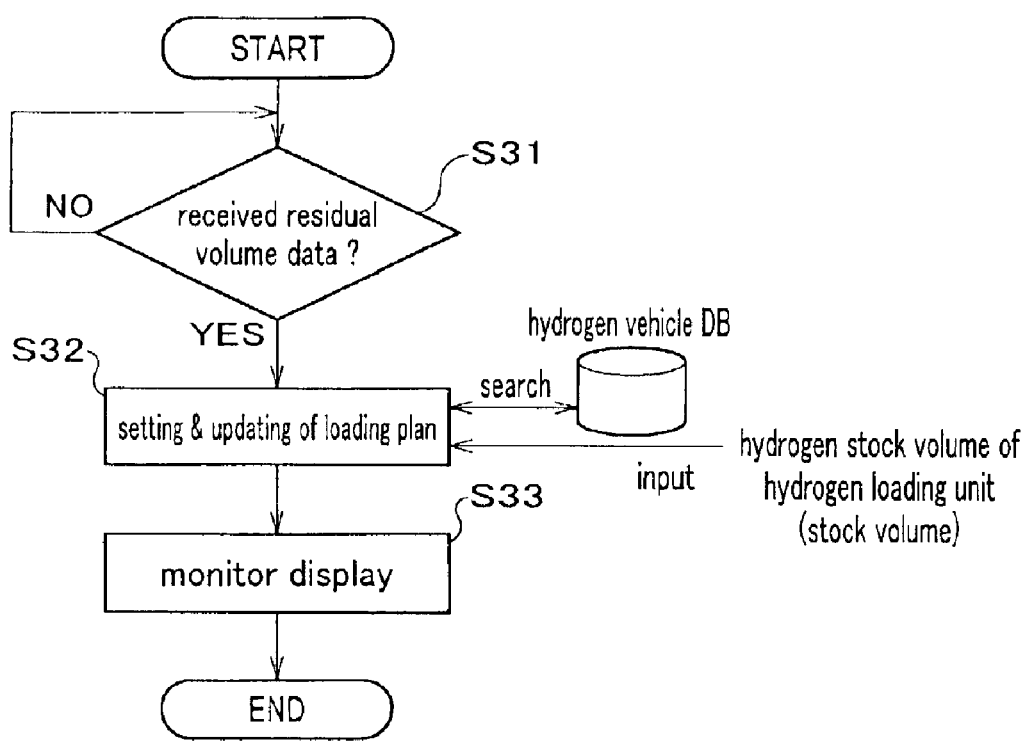
FIG. 7 is a flow diagram describing the operation of the control server shown in FIG. 1.

The method for controlling the respective items described above (the method for controlling the hydrogen station loading) will be described referring to the drawings. FIGS. 6A and 6B are flow diagrams showing the functional flow of each of the vehicle onboard terminals 20 (the control unit 21): FIG. 6A shows the main routine and FIG. 6B the subroutine. FIG. 7 is a flow diagram showing the functional flow of the control server 10.

The operation of each of the vehicle onboard terminals 20 will be described along with the flow diagrams of FIGS. 6A and 6B, referring to the FIGS. 1–5.

A driver gets in a hydrogen vehicle 2 and turns on the main switch SW to start it. The vehicle onboard terminal 20 is then initiated (S11). The control unit 21 reads various programs from the memory 22 such as a program executing the residual hydrogen information receiving function 21a. The system check is performed as required. Since the main switch SW ON corresponds to one of the predetermined timings, the communication processing function 21c transmits the residual volume data generated by the residual volume data generating function 21b (S12).

As shown in the subroutine of FIG. 6B, the residual hydrogen information receiving function 21a of the control unit 21 receives the residual volume information of each of the hydrogen containers T sent by the residual hydrogen sensor 23 (S21). Subsequently, the residual volume data generating function 21b generates the residual volume data formatted as shown in FIG. 3 based upon the residual volume information (S22). The communication processing function 21c commands the communication unit 24 to transmit the generated residual volume data (S23). The residual volume data (residual volume) is thereby transmitted to the control server 10.

After the completion of transmission of the residual volume data at S12, the vehicle onboard terminal 20 determines whether or not a predetermined time (for example, 10 minutes) has passed after the previous transmission of the residual volume data (S13). In the case of NO, the vehicle onboard terminal 20 waits for the following timing. In the case of YES, the vehicle onboard terminal 20 transmits the residual volume data executing the subroutine shown in FIG. 6B, since it meets the predetermined timing (S21–S23). The vehicle onboard terminal 20 determines whether or not the main switch SW is turned off (S15). If the main switch SW is not OFF (NO), the vehicle onboard terminal 20 returns to S13 and transmits the residual volume data every time period (e.g. 10 minutes). The residual volume data is thus transmitted to the control server 10. The data transmission may alternatively be performed for a predetermined distance. Namely, it may be performed at the predetermined regular intervals, either timewise or distancewise.

If the main switch SW is, on the other hand, OFF (YES) at S15, the communication processing function 21c recognizes the timing, transmits the residual volume data executing the subroutine shown in FIG. 6B (S21–S23), and turns off the power to the control unit 21, thereby preventing the exhaustion of the power source (S17). The hydrogen volume (residual volume) of each of the hydrogen containers T of each of the hydrogen vehicles 2 is sent to the control server 10 as residual volume data securely at an appropriate timing.

The operation of the control server 10 will be described along with the flow diagram of FIG. 7, referring to the FIGS. 1–5.

The control server 10 waits for the receiving of the residual volume data (residual volume) (S31). If the control server 10 receives the residual volume (YES), it generates or updates the loading plan based upon the received residual volume data, searched data of the hydrogen vehicle DB 12a and the entered data of the stock volume (S32). The control server 10 displays the loading plan on the monitor (not shown) (S33). The loading plan is displayed on the monitor as shown in FIG. 4. The flow shown in FIG. 7 will be executed repeatedly at intervals of several minutes.

The administrator of the control server 10 can know beforehand that one of the hydrogen vehicles 2 with the registration number 04 will visit the hydrogen station 1 for loading shortly by the displayed information on the monitor. And he can estimate the current status of the hydrogen volume—an excess or shortage—based on the displayed hydrogen excess/shortage volume. If a shortage is anticipated, he produces hydrogen with a hydrogen generating unit 40 and stores it in the hydrogen loading unit 30. If the shortage is small, the hydrogen is generated from water by electrolysis utilizing the electric power produced only by the photovoltaic power generation of a solar panel 40a. If the shortage is large, the hydrogen is generated utilizing the nighttime electricity. Furthermore, if it is much larger, the daytime electricity is used additionally for the generation of hydrogen, though a cost increase follows.

The hydrogen station communication network system according to the first embodiment allows the hydrogen station loading control unit 10, which is connected to the network system, to know beforehand a fairly accurate time of the visit by each of the hydrogen vehicles 2 for loading hydrogen, without any notice by the driver of each of the hydrogen vehicles 2. The hydrogen station loading control unit 10 can also estimate the current status of the hydrogen volume—an excess or shortage—of the hydrogen station 1 accurately. It effects the production (generation and procurement) of hydrogen according to the plan, thereby allowing the hydrogen station 1 to load each of the hydrogen vehicles 2 with hydrogen smoothly without shortage, even if the scale of the hydrogen station 1 is small. In other words, the small-scale hydrogen station 1 can conduct the effective hydrogen loading of each of the hydrogen vehicles 2 utilizing the loading plan generated by the hydrogen station loading control unit 10. On the other hand, a driver can enjoy driving a hydrogen vehicle 2 since he doesn't encounter the inconvenience caused by the shortage at the hydrogen station 1, which will contribute to the promotion of the hydrogen vehicles 2 which are more friendly to the earth environment.

The judgment on hydrogen loading shown in FIG. 4 can be performed based upon the loading history of each of the hydrogen vehicles 2, which may be stored in the memory unit 12. The hydrogen excess/shortage volume of the loading plan shown in FIG. 3 is not a mandatory item. If this item is omitted, the input of the stock volume is unnecessary.

The driving plan data of the hydrogen vehicles 2 can be added to the data which each of the vehicle terminals 20 transmits to the control server 10 (see FIG. 1). The driving plan data includes, for example, the distance (or destination and itinerary) to be planed for the day, which the driver enters through an input means (not shown) when he turns on the main switch SW. The control server 10 can thus make a judgment on hydrogen loading more accurately or make it with prediction taking into account the driving plan data.

2. Second Embodiment

The present invention according to the second embodiment will be described referring to the drawings.

In the second embodiment, the hydrogen loading time is set, which is transmitted to the vehicle onboard terminal and the cellular phone of the administrator of a hydrogen vehicle, in addition to the process of the first embodiment. According to this embodiment, a hydrogen station informs the hydrogen vehicle of the loading time, thereby allowing the driver to have a choice for loading time. The descriptions will be omitted for the items of the second embodiment which are the same as those of the first embodiment, bearing the same names and symbols.

Figure 11:
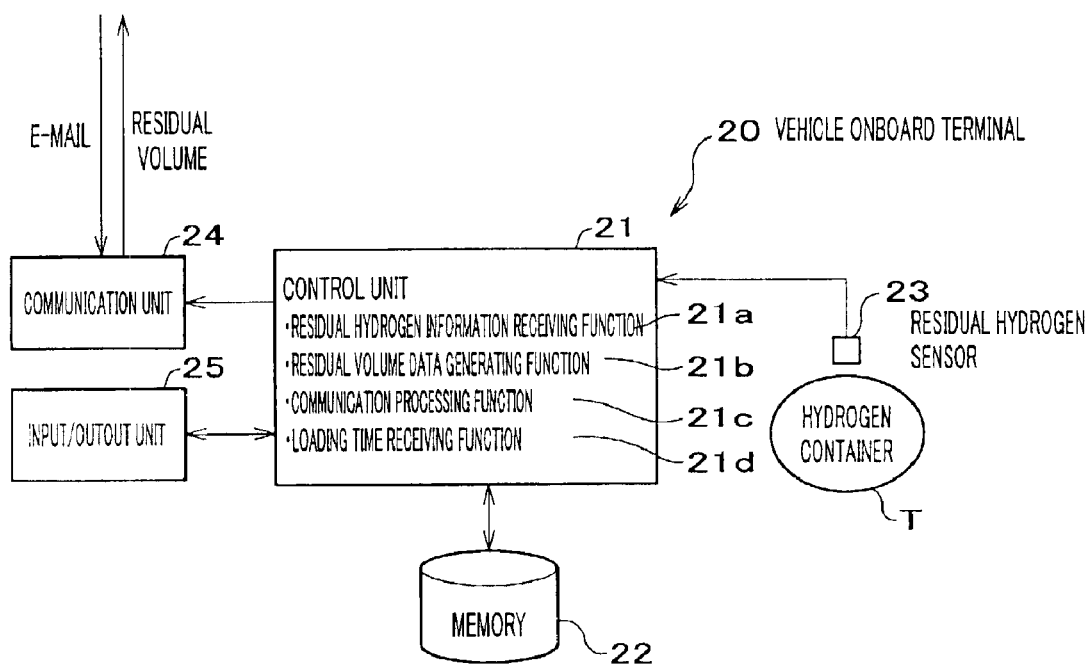
FIG. 11 is a figure showing the structure of the vehicle onboard terminal shown in FIG. 8.

FIG. 8 is an overall structural figure illustrating the communication network of a hydrogen station according to the second embodiment, to which the hydrogen station loading control unit of the present invention is applied. FIG. 9 is a figure showing examples of loading plan and loading time, which are generated by the control server shown in FIG. 8. FIG. 10 is a figure showing the format of the hydrogen vehicle DB stored in the memory unit of the control server shown in FIG. 8. FIG. 11 is a figure showing the structure of the vehicle onboard terminal shown in FIG. 8.

a. Control Server

As shown in FIG. 8 a main control unit 11 of a control server 10 according to the second embodiment has a loading time setting & notifying function 11d. This function according to the present embodiment sets the respective hydrogen loading times for hydrogen vehicles 2 based on the hydrogen loading plan (see FIG. 9) and transmits them to predetermined addresses by e-mail. The addresses are stored in a hydrogen vehicle DB 12a as shown in FIG. 10. The timing of notification (transmitting an e-mail) is, for example, synchronized with the time when the hydrogen excess/shortage volume of the loading plan has the negative sign, identified with a black triangle shown in FIG. 9.

The loading time setting & notifying function 11d notifies the driver of each of the hydrogen vehicles 2, which is judged to need loading identified with a circle in the column of FIG. 9, of the recommendation for hydrogen loading with the message "Full loading is available anytime now", when the hydrogen station 1 has sufficient volume of hydrogen normally. It is advantageous for the hydrogen station 1 if loading is conducted while it has a sufficient stock of hydrogen, since departure from the loading plan is then prevented. When a shortage of hydrogen volume occurs (the hydrogen excess/shortage volume has the negative sign identified with a black rectangle) based on whether loading of hydrogen is performed for all of the hydrogen vehicles 2, which are identified with circles in the column of judgment on loading, the loading time setting & notifying function 11d gives the order of priority for these hydrogen vehicles 2. The priority is, for example, placed in order of less residual hydrogen volume of each of the hydrogen containers T. The priority may also be placed taking into account the driving plan data described in the first embodiment. A loading time is set for each of the hydrogen vehicles 2 based on the priority. The capacity of a hydrogen generating unit 40 is considered in setting the loading time. When setting of the loading time is completed, each of the hydrogen vehicles 2 will be notified of it by e-mail. The notification of loading time reads, for example, "Full loading is available if you come for loading on XY (month day)". The function of each task will be described later referring to the flow diagram.

b. Vehicle Onboard Terminal

As shown in FIG. 11, each of the vehicle onboard terminals 20 of the second embodiment incorporates a loading time receiving function 21d into a control unit 21. It also has an input/output unit 25, which includes a monitor and control keys. The loading time receiving function 21d is capable of receiving the e-mail of loading time notification and displaying the contents of the e-mail on the monitor of the input/output unit 25. This function can be handled by cellular phones CP shown in FIG. 8 instead. In that case, the loading time notification can be received and displayed by the cellular phones CP.

c. Operation

The operation of the hydrogen station communication network system according to the second embodiment will be described, separating the control server 10 from the vehicle onboard terminals 20.

Figure 12:
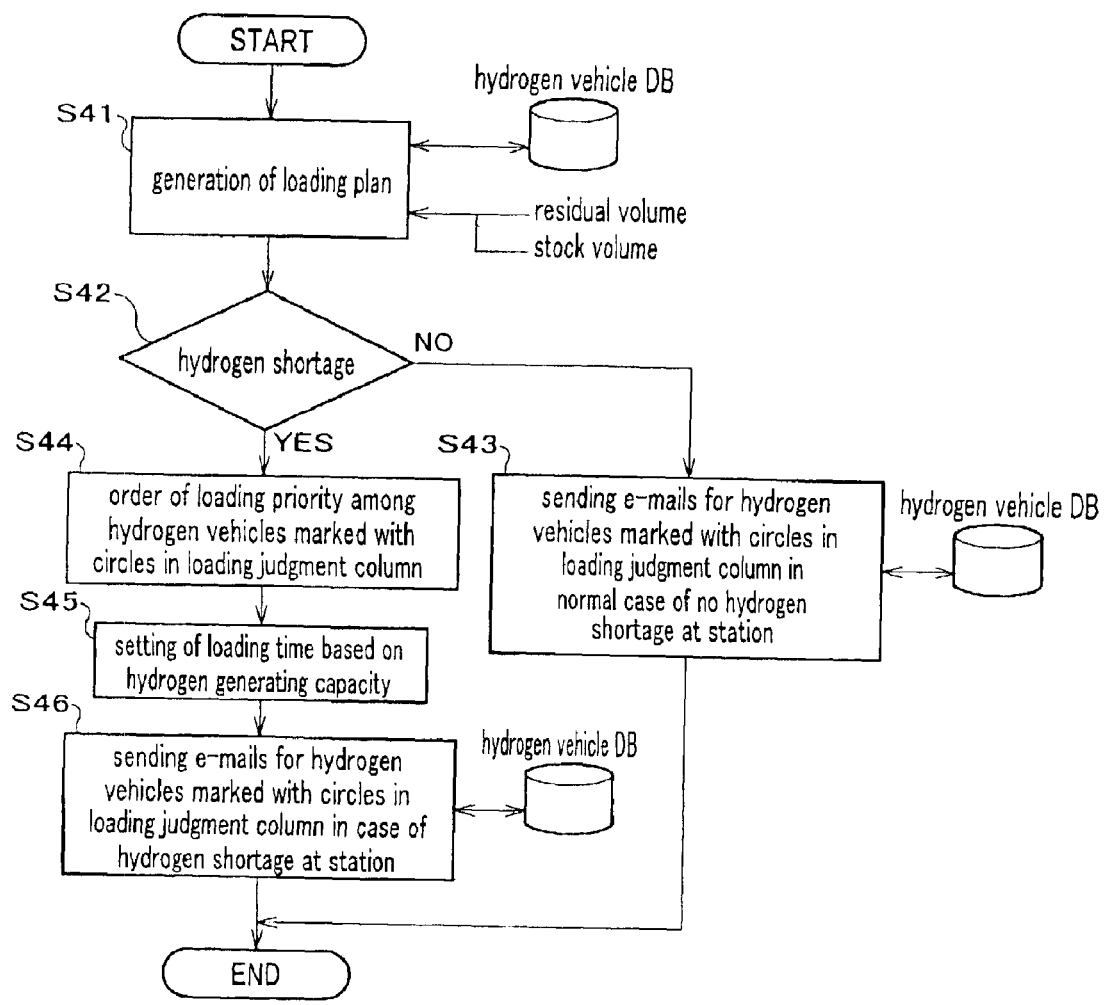
FIG. 12 is a flow diagram describing the operation of notifying the loading time by the control server shown in FIG. 8.

The operation of the control server 10 according to the second embodiment will be described referring to FIG. 12. FIG. 12 is a flow diagram showing the steps associated with the loading time notification.

The control server 10 generates a loading plan receiving the residual volume data from each of the hydrogen vehicles 2 in the same manner as that of the first embodiment (see FIG. 12, S41). It makes a judgment on whether or not a shortage of hydrogen could occur (S42). A loading plan generating function 11b is responsible for this step. In the normal case a shortage of hydrogen doesn't occur, the loading time setting & notifying function 11d transmits by e-mail the loading time notification, "Full loading is available anytime now", to those of the hydrogen vehicles 2, which are judged to need loading identified with circles in the column of the judgment on loading (S43). The contact addresses stored in the hydrogen vehicle DB 12a shown in FIG. 10 are referred to when sending e-mails. This will complete all the steps.

When a shortage of hydrogen is anticipated at S42, the loading time setting & notifying function 11d gives a priority to each of the hydrogen vehicles 2, which is identified with a circle in the column of the judgment on loading (S44), and determines each loading time taking into account the volume of the generated hydrogen (S45). It will send by e-mail the loading time notification, "Full loading is available if you come for loading on XY (month, day)" (S46). The contact addresses stored in the hydrogen vehicle DB 12a shown in FIG. 10 are referred to when sending e-mails. This will complete all the steps.

The flow is executed repeatedly at predetermined regular intervals. A transmission flag is prepared so that the same loading time notification may not be retransmitted in a predetermined time period (e.g. one day). In this connection, a loading plan is generated at S41 when the flow shown in FIG. 12 is executed again. The loading time notification is performed again if the loading plan is updated.

Each of the vehicle onboard terminals 20, to which the loading time setting & notifying function 11d sends the loading time notification by e-mail, receives and displays it. The driver thus knows the loading time.

According to the second embodiment, the driver of each of the hydrogen vehicles 2 is notified of a loading time, which is based on the loading plan generated by the loading time setting & notifying function 11d, when a shortage of hydrogen is predicted. In this way, the driver of each of the hydrogen vehicles 2 will not encounter the inconvenience of hydrogen shortage at the hydrogen station 1. The hydrogen loading can be conducted smoothly without a hydrogen shortage even if the scale of the hydrogen station 1 is small. In other words, the present invention allows the hydrogen station 1 to load the hydrogen vehicles 2 with hydrogen without increasing the scale of the station.

A description has been made for the approach of the loading time notification in this second embodiment, but the hydrogen volume to be loaded could be notified alternatively. The volume obtained from the hydrogen stock volume divided by the number of the hydrogen vehicles 2 identified with circles in the column of the judgment on loading could be notified as the loading volume available. The notification, for example, is "xxN cubic meters of hydrogen is available for loading now, 80% of the container".

The loading time notification can be received by the vehicle onboard terminals 20, the cellular phones CP and personal computers at an office and home.

3. Third Embodiment

The third embodiment will be described referring to the drawings.

In the third embodiment, a plurality of hydrogen stations are connected by a network. The descriptions will be omitted for the items of the third embodiment which are the same as those of the first and second embodiments, bearing the same names and symbols.

a. Control Server

Figure 13:
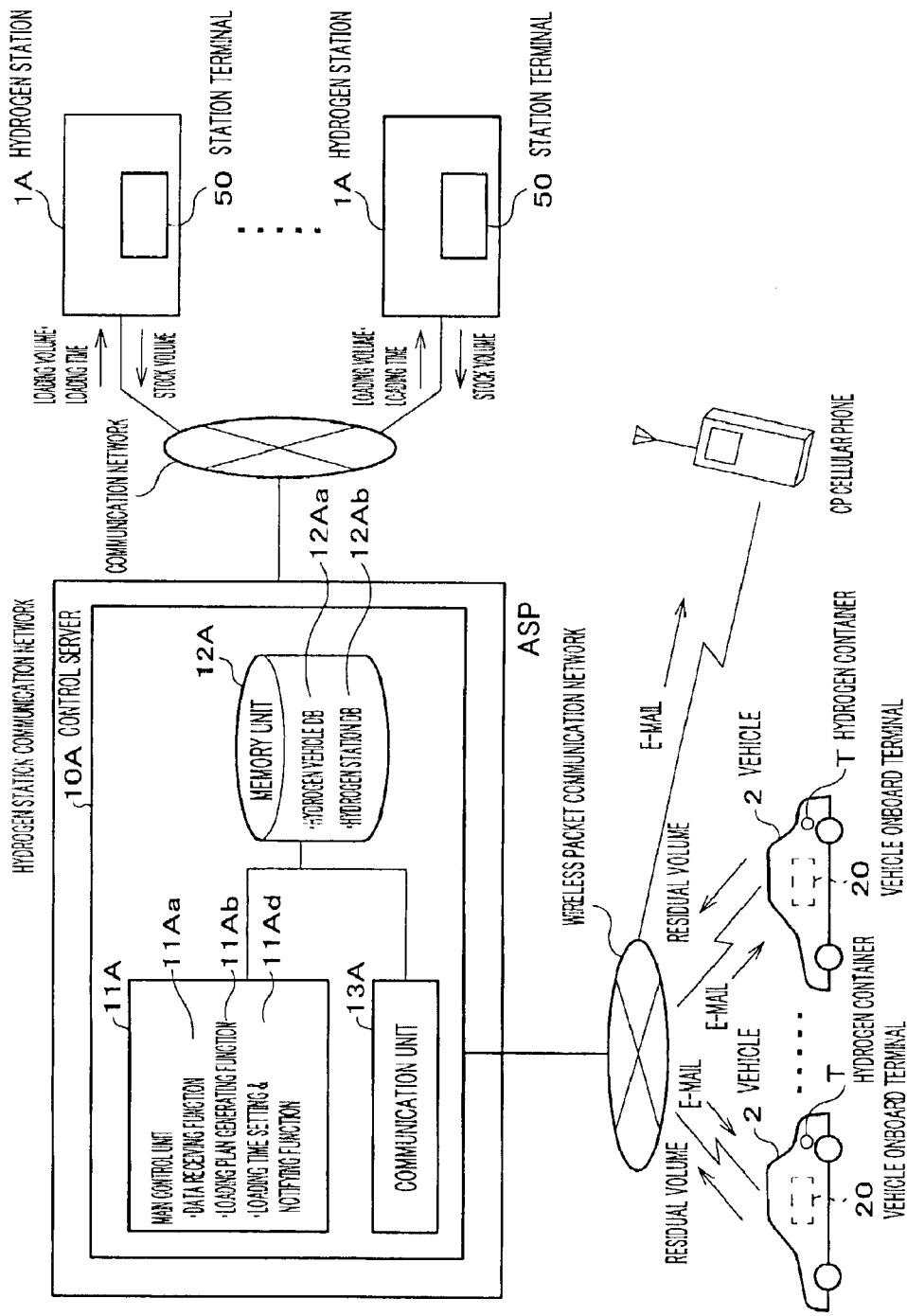
FIG. 13 is an overall structural figure showing the hydrogen station communication network system according to the third embodiment, to which the hydrogen station loading control unit of the present invention is applied.

A control server 10 will be described. FIG. 13 is a figure showing the overall structure of the hydrogen station communication network system according to the third embodiment, to which the hydrogen station loading control unit of the present invention is applied. FIG. 14 is a figure showing the format of the hydrogen vehicle DB stored in the memory unit of the control server shown in FIG. 13. FIG. 15 is a figure showing the format of the hydrogen station DB stored in the memory unit of the control server shown in FIG. 13.

As shown in FIG. 13, a control server 10A is connected to a plurality of hydrogen stations 1A and a plurality of hydrogen vehicles 2 through a communication network and a wireless packet communication network. The control server 10A of the third embodiment is installed at an ASP (Application Service Provider) which provides various applications such as road information to users (drivers, gasoline stations, drive-inns, transportation companies, etc.). The operation and control of the control server 10A is performed by the ASP.

As shown in FIG. 13, a main control unit 11A of the control server 10A of the third embodiment includes a data receiving function 11Aa, a loading plan generating function 11Ab and a loading time setting & notifying function 11Ad. The data receiving function 11Aa receives the stock volume (hydrogen stock volume) from each of hydrogen stations 1A in addition to the residual volume (residual volume data) from each of hydrogen vehicles 2. The loading plan generating function 11Ab generates a loading plan for each of the hydrogen stations 1A based on the received residual volume data and the stock volume. The loading time setting & notifying function 11Ad generates a loading time for each of the hydrogen vehicles 2 which come to each of the hydrogen stations 1A for loading, based upon the loading plan of each of the hydrogen stations 1A. The loading time setting & notifying function 11Ad also transmits (notifies) the loading time and the loading plan to each of the hydrogen stations 1A through the communication network. It also transmits the loading time to each of the vehicle onboard terminals 20 of each of the hydrogen vehicles 2 by e-mail through the wireless packet communication network. The details about these processes will be later described referring to the flow diagram.

A hydrogen vehicle DB 12Aa stored in a memory unit 12A has a format shown in FIG. 14. It contains the information of the regular hydrogen station that tells which hydrogen station each of the hydrogen vehicles 2 regularly uses, which is different from the second embodiment. The loading plan and the loading time are generated taking into account this information. Similarly, a hydrogen station DB 12Ab of the memory unit 12A includes the data such as hydrogen station number, name of administrator, capacity of hydrogen generating unit, stock volume (hydrogen stock volume) and contact address. The regular hydrogen station and the hydrogen station number are correlated with each other.

A communication unit 13A supports not only the communication with the vehicle onboard terminals 20 and cellular phones CP but station terminals 50 which are installed at the hydrogen stations 1A through the communication network.

b. Hydrogen Station

As shown in FIG. 13, each of the hydrogen stations 1A is equipped with each of the station terminals 50 which communicates with the control server 10A through the communication network. Each of the station terminals 50 is capable of transmitting the hydrogen stock volume of each of the hydrogen stations 1A to the control server 10A for each 10 minutes, for example, through the communication network. Also each of the station terminals 50 receives the loading plan transmitted (notified) by the control server 10A through the communication network. Each of the station terminals 50 is continuously turned on so that it can receive the loading plan (and loading time) transmitted by the control server 10A. Each of the hydrogen stations 1A includes a hydrogen loading unit 30 and a hydrogen generating unit 40 similar to those of the first embodiment (see FIG. 1).

c. Vehicle Onboard Terminal

The explanation of vehicle onboard terminals 20 is omitted since they are same as those of the second embodiment.

d. Operation

Figure 16:
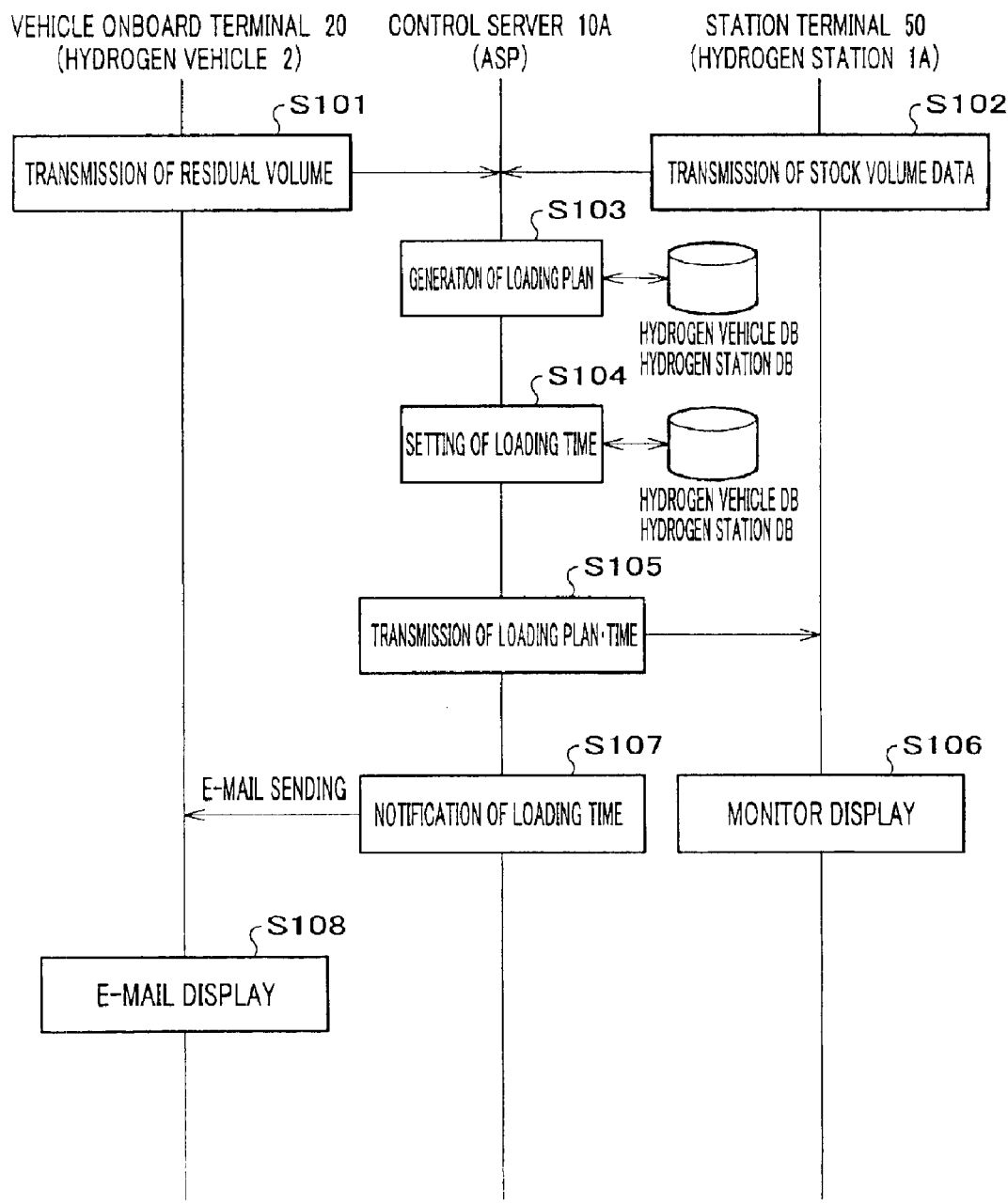
FIG. 16 is a flow diagram describing the operation of the hydrogen station communication network shown in FIG. 13.

The operation of the hydrogen station communication network system according to the third embodiment will be described along with the flow diagram (sequence chart) shown in FIG. 16, referring to FIGS. 13–15. This sequence chart shows only one of the vehicle onboard terminals 20 (one of the hydrogen vehicles 2) and one of the station terminals 50 (one of the hydrogen stations 1A) typically.

The residual volume data is transmitted to the control server 10A by each of the vehicle onboard terminals 20 of each of the hydrogen vehicles 2 through the packet communication network (S101, see FIG. 6). The hydrogen stock volume is transmitted to the control server 10A by each of the hydrogen stations 1A through the communication network (S102). The time interval of transmission is, for example, 10 minutes. The loading plan generating function 11Ab of the control server 10A generates a loading plan for each of the hydrogen stations 1A based on the residual volume of each of the hydrogen vehicles 2 and the stock volume of each of the hydrogen stations 1A, referring to the hydrogen vehicle DB 12Aa and the hydrogen station DB 12Ab (S103).

The loading time setting & notifying function 11Ad of the control server 10A sets the loading time of each of the hydrogen vehicles 2 for each of the hydrogen stations 1A (S104). And at S105, the loading time setting & notifying function 11Ad transmits (notifies) the loading plan and the loading time to each of the hydrogen stations 1A. FIG. 17 depicts the output image conceptually, in which the loading plan and the loading time of each hydrogen stations 1A are transmitted (notified) in the manner shown in the figure such as A hydrogen station, B hydrogen station, C hydrogen station . . . . Each of the station terminals 50 is in service on a 24-hour basis and displays the received loading plan and the loading time on the monitor of each of the input/output units 25 (see FIG. 11) of each of the station terminals 50 (S106). Each of the hydrogen stations 1A can thus know its own loading plan and the loading time.

Further, the loading time setting & notifying function 11Ad notifies each of the hydrogen vehicles 2 (vehicle onboard terminals 20) of the loading time by e-mail (S107). Each of the vehicle onboard terminals 20 receives the e-mail and displays it (S108). The driver can thus know when the hydrogen loading is available at his regular one of the hydrogen stations 1A.

The hydrogen station communication network according to the third embodiment gives each of the hydrogen stations 1A and each of the hydrogen vehicles 2 the same benefits as those achieved by the second embodiment. Each of the hydrogen stations 1A can therefore load each of the hydrogen vehicles 2 smoothly without increasing the scale of station. Also each of the hydrogen vehicles 2 can have the benefit of smooth hydrogen loading. The third embodiment allows each of the hydrogen stations 1A to dispense with the server (the control server 10A) to communicate with the hydrogen vehicles 2. All that the hydrogen stations 1A require is thus the station terminals 50. An inexpensive personal computer with a function of browsing the internet will serve sufficiently as each of the station terminals 50, which will permit each of the hydrogen stations 1A to be an inexpensive facility. Though the technical knowledge is generally required for the maintenance of a server, each of the hydrogen stations 1A is free of the trouble associated with the maintenance since no control server 10A is required to install at each of the hydrogen stations 1A. The ASP which operates and controls the control server 10A will obtain the necessary finances for the maintenance in the form of fees and advertisement charges from the hydrogen stations 1A and sponsors.

Description has been made for the case of the third embodiment in which the loading plan is generated setting a regular hydrogen station for each of the hydrogen vehicles 2. It is alternatively possible to generate a loading plan assuming that each of the hydrogen vehicles 2 is loaded at the nearest one of the hydrogen stations 1A, utilizing the positioning data of each of the hydrogen vehicles 2 obtained by GPS etc.

4. Fourth Embodiment

The fourth embodiment will be described referring to the drawings.

In the fourth embodiment, a plurality of hydrogen stations are connected through a network, thereby allowing a hydrogen vehicle to be loaded with hydrogen on the way when a long-distance trip is made by the hydrogen vehicle. The descriptions will be omitted for the items which are the same as those of the first through third embodiments, bearing the same names and symbols.

Figure 18:
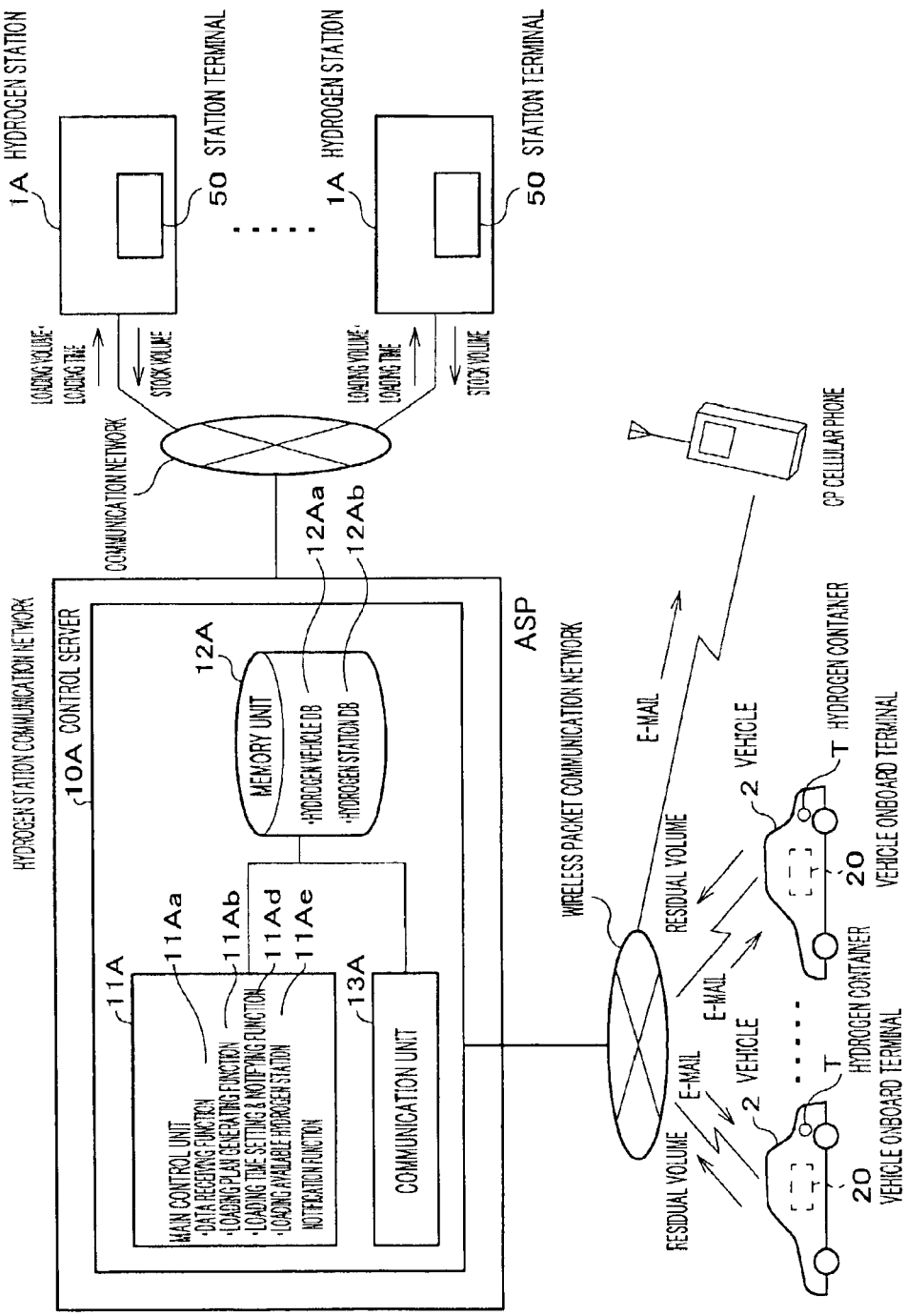
FIG. 18 is an overall structural figure showing the hydrogen station communication network system according to the fourth embodiment, to which the hydrogen station loading control unit of the present invention is applied.

FIG. 18 is a figure showing the overall structure of the hydrogen station communication network system, to which the hydrogen station loading control unit according to the present invention is applied. FIG. 19 is a figure showing the format of the hydrogen station DB which is stored in the control server.

a. Control Server

A control server 10A according to the fourth embodiment will be described.

The control server 10A of the fourth embodiment shown in FIG. 18 receives the loading inquiry about the availability of hydrogen stations 1A from hydrogen vehicles 2 (vehicle onboard terminals 20) and cellular phones CP. The control server 10A notifies each of the hydrogen vehicles 2 of a list of the loading available hydrogen stations 1A which are located near the vehicle position, searching a hydrogen station DB 12Ab based upon the positioning data included in the loading inquiry.

A main control unit 11 of the control server 10A has a loading available hydrogen station notification function 11Ae which is mainly responsible for responding to the loading inquiry. A hydrogen station DB 12Ab of a memory unit 12A has the format shown in FIG. 19. The hydrogen shortage volume stored in the hydrogen station DB 12Ab refers to the hydrogen shortage volume of the loading plan shown in FIGS. 4 and 9. The loading available hydrogen station notification function 11Ae makes a list of the loading available hydrogen stations 1A which have the hydrogen more than the volume that is sufficient to load more than half of each of the hydrogen containers T of each of the hydrogen vehicles 2, and notifies each of the vehicle onboard terminals 20 of the list. When the list of the loading available hydrogen stations is generated, the hydrogen stations located near a hydrogen vehicle can be obtained utilizing the generally applied method with the postal code data base.

The loading available hydrogen station notification function 11Ae receives the hydrogen station selection information, which is transmitted responding to the notified loading available hydrogen stations, from the vehicle onboard terminals 20. It also sends the received hydrogen station selection information to the selected hydrogen stations 1A and directs the loading plan generating function 11Ab to update the loading plan.

b. Vehicle Onboard Terminal

Control units 21 of the vehicle terminals 20 are capable of browsing, inquiring of the control server 10A about loading and selecting the hydrogen stations 1A in addition to the functions of the second and third embodiments.

c. Operation

Figure 20:
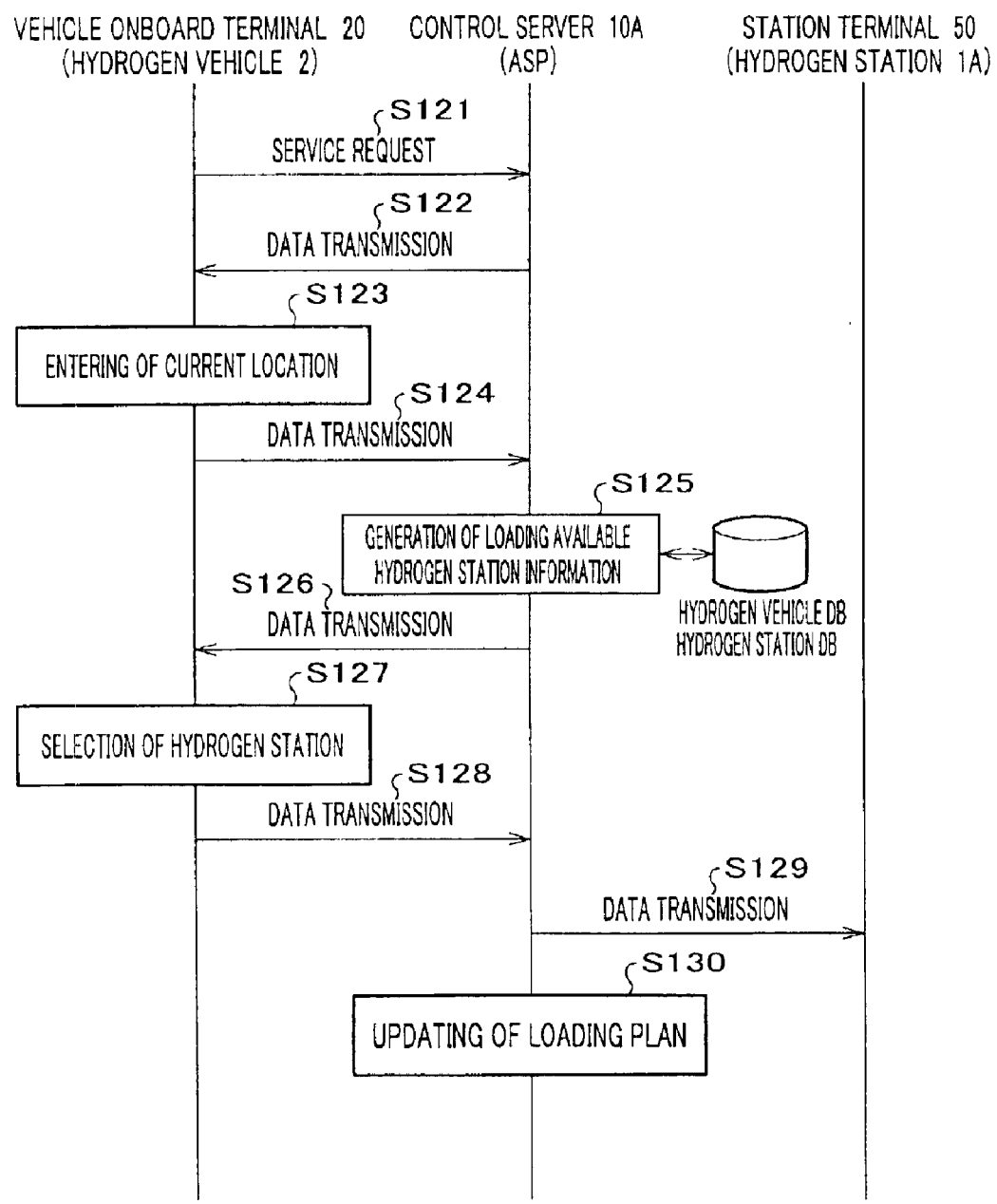
FIG. 20 is a flow diagram describing the operation of the hydrogen station communication network shown in FIG. 18.

The operation of the hydrogen station communication network system according to the fourth embodiment will be described along with the flow diagram shown in FIG. 20, referring to FIGS. 1, 8, 19, 21 and 22. FIG. 20 is a flow diagram illustrating the operation of the hydrogen station communication network according to the fourth embodiment. FIG. 21 is a page showing the loading inquiry which is displayed on a vehicle onboard terminal. FIG. 22 is a page showing the list of the loading available hydrogen stations, which is also displayed on the vehicle onboard terminal.

It is assumed for the fourth embodiment that each of the hydrogen vehicles 2 continuously sends the residual volume to the control server 10A. And each hydrogen stations 1A continuously sends the stock volume to the control server 10A.

As shown in FIG. 20, each of the vehicle onboard terminals 20 accesses the control server 10A to ask for the service (S121). The steps of asking for the service are the same as those generally applied to the wireless internet. The control server 10A sends the data of loading inquiry page shown in FIG. 21 (S122). The approximate current location of each of the hydrogen vehicles 2 is entered when the loading inquiry page transmitted by the control server 10A is displayed on each of the vehicle onboard terminals 20 (S123). In FIG. 21 "Utsunomiya city" is entered, for example. And each of the vehicle onboard terminals 20 transmits the current location (S124). The steps S122–S124 can be deleted if the positioning data detected by GPS is transmitted while asking for the service at S121 or while transmitting the residual volume.

The control server 10A (the loading available hydrogen station notification function 11Ae) generates the loading available hydrogen station information referring to the hydrogen vehicle DB 12Aa and the hydrogen station DB 12Ab, when the control server 10A receives the current location of each of the hydrogen vehicles 2 (S125). The control server 10A then transmits the loading available hydrogen station information to each of the vehicle onboard terminals 20A (S126). The page shown in FIG. 22 is displayed on each of the vehicle onboard terminals 20A. A driver can know the hydrogen stations 1A which are located near his current location and available for hydrogen loading. The driver selects the hydrogen station at which he desires to load his hydrogen vehicle (S127). The vehicle onboard terminal transmits the data of selected hydrogen station to the control server 10A (S128). The control server 10A transmits the data to the selected hydrogen station when the control server 10A receives it (S129). The selected hydrogen station can thus know in advance that the hydrogen vehicle, which has not been expected, is coming for the hydrogen loading, thereby allowing preparation for loading. The control server 10A updates the loading plan (S130).

The fourth embodiment can attain many conveniences since a driver can find a loading available hydrogen station by the hydrogen station communication network system easily even if he makes a long-distance trip with his hydrogen vehicle. The hydrogen station which has a sufficient stock volume is selected so that a smooth loading without shortage can be performed. It is also possible to prevent an unexpected loading, which is undesirable for the hydrogen stations 1A.

In the fourth embodiment, each of the hydrogen vehicles 2 sends the inquiry about the hydrogen loading. The information about loading available hydrogen stations may instead be voluntarily supplied to each of the hydrogen vehicles 2 by the control server 10A. The control server 10A always possesses the residual hydrogen volume of each of the hydrogen vehicles 2 and determines if it requires a loading, indicating the result in the loading judgment column. So it is possible to send the list of the loading available hydrogen stations to the vehicle onboard terminals 20, which display it as shown in FIG. 22, and to recommend hydrogen loading for a hydrogen vehicle when it is identified as a loading necessary vehicle with a circle in the loading judgment column. It is thus possible to prevent an occasion of driving trouble caused by fuel shortage.

Cellular phones CP and mobile personal computers can be used instead of vehicle onboard terminals 20, with which the control server 10A communicates.

In the fourth embodiment, a driver searches for the hydrogen stations 1A on the way. It may be modified so that the driver can reserve the hydrogen stations 1A before he leaves. Specifically, the loading inquiry page shown in FIG. 21 is modified to a loading reservation page so that the driver can enter the destination and the control server 10A can display a list of the hydrogen stations 1A located in the appropriate areas and accept a reservation. It is thus possible to prevent the unexpected loading at the hydrogen stations 1A, thereby allowing the hydrogen loading according to the plan.

It will now be appreciated from the foregoing description that the present invention is not limited to the particularly illustrated embodiments (the first through fourth embodiments) discussed above and may be carried out in various modified forms.

The hydrogen can be produced by operating a hydrogen generating unit 40 according to a table defining the work level of the hydrogen generating unit 40 (see FIG. 1) based on the hydrogen excess/shortage volume and the capacity of the hydrogen generating unit 40 such as the hydrogen generating unit work pattern table shown in FIG. 23, which defines the level of the hydrogen excess/shortage volume and the work pattern. In this connection, "a production planning means which prepares a production plan for said hydrogen generating unit" refers to defining the level of the hydrogen generation unit work pattern table. The table may be integrated with the hydrogen generating unit 40 so that it can be automatically operated. The hydrogen generating unit 40 is not limited to an electrolysis type, but generators employing city gas (methane gas) and reforming of methanol can be alternatives. Any type of hydrogen generating unit can be employed for a hydrogen station. When the solar panel 40a is used for photovoltaic power generation, another work level of both nighttime and daytime electricity may be defined when it is rainy or cloudy, incorporating the data of weather forecast.

In the third and fourth embodiments (see FIG. 13), a third organization which is specialized in network related businesses such as the ASP is assigned for the operation and control of the hydrogen station communication network. A business unit of hydrogen stations can instead operate and control the hydrogen station communication network. It doesn't matter whether the business unit has a station or plural stations.

Each of the control servers 10 and 10A (see FIGS. 1 and 13) is not necessarily composed of one unit of computer. It may be composed of decentralized computers connected by LAN and WAN. Each location of the control servers 10 and 10A is not necessarily limited either. The control server 10 is located at the hydrogen station 1 as shown in FIG. 1, but it may also be located in a different city (a foreign country) which is far from the location of the hydrogen station 1.

The residual volume (residual volume data) may be sent by each of the hydrogen vehicles 2 to the control server 10 through each of the hydrogen stations 1A in the third and fourth embodiments (see FIG. 13). It doesn't matter how the middle communication path is selected for the residual volume which is transmitted from each of the hydrogen vehicles 2 to the control server 10. In other words, the server and the rooter (access point and relaying point), through which the residual volume (residual volume data) passes, are arbitrarily selected. It is also true of the first embodiment. Similarly, the stock volume can be sent through the plural hydrogen stations 1A one after another to the control server 10A.

When a hydrogen station communication network is established among several hydrogen stations in the neighborhood, the regular hydrogen station of the hydrogen vehicle DB shown in FIG. 14 is unnecessary. Under the conditions of a small number of hydrogen stations 1A, it is easy to estimate which hydrogen vehicle come for loading to which hydrogen station. (There is little possibility that the loading plan generated based on the estimation will depart from the original.)

In the first through fourth embodiments (see FIGS. 1 and 13), when an unexpected hydrogen vehicle comes to a hydrogen station for loading, it can be so arranged that the hydrogen station introduces other loading available hydrogen stations to the hydrogen vehicle.

When an unexpected hydrogen vehicle comes to a hydrogen station for loading, it can also be so arranged that the hydrogen station loads the vehicle with hydrogen even if its hydrogen excess/shortage volume has a negative sign (black rectangle). The unexpected loading is reflected on the loading plan directly and thereby the loading plan is updated. Thus the smooth hydrogen loading without shortage will be provided according to the new loading plan. It is also reflected on the hydrogen excess/shortage level of the hydrogen generating unit 40 (hydrogen generating unit work level pattern table shown in FIG. 23) and thereby the level is updated. The necessary hydrogen can thus be produced according to the new level. Though the loading available hydrogen station information (see FIG. 22) is generated based on the hydrogen stations whose hydrogen excess/shortage volumes have the positive signs in the fourth embodiment (see FIG. 18), it can also be generated based on other additional hydrogen stations of the negative signs.

Other combinations among the first through fourth embodiments and variations can be alternatives.

What is claimed is:

1. A hydrogen station loading control unit which is capable of communicating through a communication network with a plurality of hydrogen vehicles that drive with hydrogen in vehicle onboard hydrogen containers loaded at a hydrogen station, comprising:
- a receiver which receives a signal relating to hydrogen volume remaining in each of said hydrogen containers from each of said hydrogen vehicles through said communication network; and
- a plan generator which generates a hydrogen loading plan for each of said hydrogen vehicles for said hydrogen station based upon said hydrogen volume remaining,
- wherein said hydrogen station loading control unit receives a signal indicative of stock volume of hydrogen from a hydrogen loading unit of said hydrogen station.

2. A hydrogen station loading control unit according to claim 1, further comprising:
- setting means for setting one of a hydrogen loading time and a hydrogen loading volume for each of said hydrogen vehicles based upon said hydrogen loading plan; and
- transmission means for transmitting said one of hydrogen loading time and hydrogen loading volume to a predetermined address for each of said hydrogen vehicles through said communication network.

3. A hydrogen station loading control unit according to claim 2, further comprising when said hydrogen station is equipped with a hydrogen generating unit for generating hydrogen:
- production planning means for preparing a production plan for said hydrogen generating unit based upon said hydrogen loading plan.

4. A hydrogen station loading control unit according to claim 3, further comprising:
- list generating means for generating a list of said hydrogen stations having locations convenient to each of said hydrogen vehicles based upon positioning data transmitted by each of said hydrogen vehicles; and
- sending back means for sending back said list of said hydrogen stations to one of a sender of said positioning data and a second address set for said sender.

5. A hydrogen station loading control unit according to claim 2, further comprising:
- list generating means for generating a list of said hydrogen stations having locations convenient to each of said hydrogen vehicles based upon positioning data transmitted by each of said hydrogen vehicles; and
- sending back means for sending back said list of said hydrogen stations to one of a sender of said positioning data and a second address set for said sender.

6. A hydrogen station loading control unit according to claim 1, further comprising when said hydrogen station is equipped with a hydrogen generating unit for generating hydrogen:
- production planning means for preparing a production plan for said hydrogen generating unit based upon said hydrogen loading plan.

7. A hydrogen station loading control unit according to claim 6, further comprising:
- list generating means for generating a list of said hydrogen stations having locations convenient to each of said hydrogen vehicles based upon positioning data transmitted by each of said hydrogen vehicles; and
- sending back means for sending back said list of said hydrogen stations to one of a sender of said positioning data and a second address set for said sender.

8. A hydrogen station loading control unit which is capable of communicating through a communication network with both a plurality of hydrogen vehicles that drive with hydrogen in vehicle onboard hydrogen containers loaded at a plurality of hydrogen stations and said plurality of hydrogen stations equipped with hydrogen loading units, comprising:
- a receiver which receives a signal relating to hydrogen volume remaining in each of said hydrogen containers from each of said hydrogen vehicles through said communication network;
- a plan generator which generates a hydrogen loading plan for each of said hydrogen vehicles for each of said hydrogen stations based upon said hydrogen volume remaining; and
- a transmitter for transmitting said hydrogen loading plan to each of said hydrogen stations,
- wherein said hydrogen station loading control unit receives a signal indicative of stock volume of hydrogen from a hydrogen loading unit of each of said hydrogen stations.

9. A hydrogen station loading control unit according to claim 8, further comprising:
- setting means for setting one of a hydrogen loading time and a hydrogen loading volume for each of said hydrogen vehicles based upon said hydrogen loading plan; and
- transmission means for transmitting said one of hydrogen loading time and hydrogen loading volume to a predetermined address for each of said hydrogen vehicles through said communication network.

10. A hydrogen station loading control unit according to claim 9, further comprising when said hydrogen station is equipped with a hydrogen generating unit for generating hydrogen:
- production planning means for preparing a production plan for said hydrogen generating unit based upon said hydrogen loading plan.

11. A hydrogen station loading control unit according to claim 10, further comprising:
- list generating means for generating a list of said hydrogen stations having locations convenient to each of said hydrogen vehicles based upon positioning data transmitted by each of said hydrogen vehicles; and
- sending back means for sending back said list of said hydrogen stations to one of a sender of said positioning data and a second address set for said sender.

12. A hydrogen station loading control unit according to claim 9, further comprising:
- list generating means for generating a list of said hydrogen stations having locations convenient to each of said hydrogen vehicles based upon positioning data transmitted by each of said hydrogen vehicles; and
- sending back means for sending back said list of said hydrogen stations to one of a sender of said positioning data and a second address set for said sender.

13. A hydrogen station loading control unit according to claim 8, further comprising when said hydrogen station is equipped with a hydrogen generating unit for generating hydrogen:
- production planning means for preparing a production plan for said hydrogen generating unit based upon said hydrogen loading plan.

14. A hydrogen station loading control unit according to claim 13, further comprising:
- list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

15. A hydrogen station loading control unit according to claim 8, further comprising:

list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

16. A hydrogen station having hydrogen for loading a vehicle onboard hydrogen container on each of a plurality of hydrogen vehicles, said hydrogen station communicating through a communication network with said each of said plurality of hydrogen vehicles, said hydrogen station comprising a hydrogen station loading control unit including:

a receiver which receives a signal relating to hydrogen volume remaining in each of said hydrogen containers from each of said hydrogen vehicles though said communication network; and a plan generator which generates a hydrogen loading plan for each of said hydrogen vehicles based upon said hydrogen volume remaining, wherein said hydrogen station loading control unit receives a signal indicative of stock volume of hydrogen from a hydrogen loading unit of said hydrogen station.

17. A hydrogen station according to claim 16 further comprising:

setting means for setting one of a hydrogen loading time and a hydrogen loading volume for each of said hydrogen vehicles based upon said hydrogen loading plan; and transmission means for transmitting said one of hydrogen loading time and hydrogen loading volume to a predetermined address for each of said hydrogen vehicles through said communication network.

18. A hydrogen station according to claim 16, further comprising when said hydrogen station is equipped with a hydrogen generating unit for generating hydrogen:

a production planning means for preparing a production plan for said hydrogen generating unit based upon said hydrogen loading plan.

19. A hydrogen station according to claim 18 further comprising:

list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

20. A hydrogen station according to claim 17, further comprising when said hydrogen station is equipped with a hydrogen generating unit for generating hydrogen:

production planning means for preparing a production plan for said hydrogen generating unit based upon said hydrogen loading plan.

21. A hydrogen station according to claim 20 further comprising:

list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

22. Hydrogen station according to claim 17 further comprising:

list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

23. Hydrogen stations having hydrogen for loading a vehicle onboard hydrogen container on each of a plurality of hydrogen vehicles, said hydrogen stations communicating through a communication network with each other and with said each of said plurality of hydrogen vehicles, each of said hydrogen stations comprising a hydrogen station loading control unit including:

a receiver which receives a signal relating to hydrogen volume remaining in each of said hydrogen containers from each of said hydrogen vehicles through said communication network;

a plan generator which generates hydrogen loading plan for each of said hydrogen vehicles for each of said hydrogen stations based upon said hydrogen volume remaining; and a transmitter for transmitting said hydrogen loading plan to each of said hydrogen stations;

wherein said hydrogen station loading control unit receives a signal indicative of stock volume of hydrogen from a hydrogen loading unit of each of said hydrogen stations.

24. Hydrogen stations according to claim 23 further comprising:

setting means for setting one of a hydrogen loading time and a hydrogen loading volume for each of said hydrogen vehicles based upon said hydrogen loading plan; and transmission means for transmitting said one of hydrogen loading time and hydrogen loading volume to a predetermined address for each of said hydrogen vehicles through said communication network.

25. Hydrogen stations according to claim 24, further comprising when said hydrogen station is equipped with a hydrogen generating unit for generating hydrogen:

production planning moans for preparing a production plan for said hydrogen generating unit based upon said hydrogen loading plan.

26. Hydrogen stations according to claim 25, further comprising:

list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

27. Hydrogen stations according to claim 24, further comprising:

list generating means for generating a list of said hydrogen stations having locations convenient to each of said hydrogen vehicles based upon positioning data transmitted by each of said hydrogen vehicles; and sending back means for sending back said list of said hydrogen stations to one of a sender of said positioning data and a second address set for said sender.

28. Hydrogen stations according to claim 23, further comprising when said hydrogen station is equipped with a hydrogen generating unit for generating hydrogen:
   production planning means for preparing a production plan for said hydrogen generating unit based upon said hydrogen loading plan.

29. Hydrogen stations according to claim 28, further comprising:
   list generating means for generating a list of said hydrogen stations having locations convenient to each of said hydrogen vehicles based upon positioning data transmitted by each of said hydrogen vehicles; and
   sending back means for sending back said list of said hydrogen stations to one of a sender of said positioning data and a second address set for said sender.

30. Hydrogen stations according to claim 23, further comprising:
   list generating means for generating a list of said hydrogen stations having locations convenient to each of said hydrogen vehicles based upon positioning data transmitted by each of said hydrogen vehicles; and
   sending back means for sending back said list of said hydrogen stations to one of a sender of said positioning data and a second address set for said sender.

31. A method for controlling hydrogen station loading with a hydrogen station loading control unit, comprising the steps of:
   receiving from a plurality of hydrogen vehicles, which drive with hydrogen in vehicle onboard hydrogen containers loaded at a plurality of hydrogen stations, a signal relating to hydrogen volume remaining in each of said hydrogen containers through a communication network;
   generating a hydrogen loading plan for each of said hydrogen stations based upon said signal relating to hydrogen volume remaining;
   determining one of a hydrogen loading time and hydrogen loading volume for each of said hydrogen vehicles based upon said hydrogen loading plan; and
   transmitting said one of said hydrogen loading time and hydrogen loading volume for each of said hydrogen vehicles through said communication network,
   wherein when said hydrogen loading plan is generated, said hydrogen station loading control unit receives a signal indicative of stock volume of hydrogen from a hydrogen loading control unit of each of said hydrogen stations.

32. A propagated signal on a carrier detectable by a main control unit of a hydrogen station with a hydrogen station loading control unit and encoding a computer program of instructions for executing a computer process for generating a hydrogen loading plan for hydrogen vehicles, said hydrogen vehicles driving with hydrogen in vehicle onboard hydrogen containers loaded at hydrogen stations, said computer process comprising:
   receiving through a communication network information relating to hydrogen volume remaining in each of said hydrogen containers from said hydrogen vehicles; and
   generating a hydrogen loading plan for each of said hydrogen vehicles,
      wherein when said hydrogen loading plan is generated, said hydrogen station loading control unit receives a signal indicative of stock volume of hydrogen from a hydrogen loading unit of said hydrogen station.

* * * * *